United States Patent [19]

Magill et al.

[11] Patent Number: 5,367,664

[45] Date of Patent: Nov. 22, 1994

[54] ELECTRONIC DOCUMENT INTERCHANGE TEST FACILITY

[76] Inventors: James W. Magill, 104 Lily Ct., Allen, Tex. 75002; Kathleen M. Adams, 6823 Winding Rose Trail, Dallas, Tex. 75252; Fred A. Sammet, 2801 Rigsbee Dr., Plano, Tex. 75074-4707

[21] Appl. No.: 753,265

[22] Filed: Aug. 30, 1991

[51] Int. Cl.[5] .................................................. G06F 1/00
[52] U.S. Cl. ...................................... 395/575; 364/226.4
[58] Field of Search ................ 395/575; 364/408, 250, 364/225.8, 226.4

[56] References Cited

U.S. PATENT DOCUMENTS

| | | | |
|---|---|---|---|
| 4,799,156 | 1/1989 | Shavit et al. | 364/408 |
| 4,951,196 | 8/1990 | Jackson | 364/401 |
| 5,202,977 | 4/1993 | Pasete, Jr. et al. | 364/200 |

FOREIGN PATENT DOCUMENTS

| | | | |
|---|---|---|---|
| 2278368 | of 1990 | Japan | G06F 15/38 |
| 3218540 | 9/1991 | Japan | G06F 11/28 |

OTHER PUBLICATIONS

David Spooner 'A data Translation Tool for Engineering Systems' 1989 pp. 96-104.
Meera M. Blattner et al. 'A User Interface for computer-Based Message Translation' 1989 pp. 43-51 Ref. (AB).
Meera M. Blattner et al. 'A Visual Interface for Generic Message Translation' 1988 pp. 121-126 Ref. (AA).
Hwa-Yea Chang et al. 'Circuit simulation and Modeling' 1990 pp. 8-13.

*Primary Examiner*—Robert W. Beausoliel
*Assistant Examiner*—Albert Decady
*Attorney, Agent, or Firm*—Tammy L. Williams; Richard L. Donaldson

[57] ABSTRACT

A method and system for electronic data interchange (EDI) translation testing displays a plurality of operator-interactive panels for controlling pre-production translation of EDI document files. The EDI Test Facility integrates numerous translator programs to detect translation errors. Once an error is detected, the EDI test facility displays the translation error and permits an operator to interactively correct the segment of the EDI document file containing the error. Once the error is corrected, the EDI Test Facility permits retranslation of the segment. When correctly translated, the segment is added to all previously corrected segments of the EDI document file in a working file. The method and system continue until stopped by the operator or EDI document file translation is complete.

7 Claims, 4 Drawing Sheets

TRANSLATOR CONFIGURATION
COMMAND  ===>.
Enter/Verify EDI Parameters Below:

Program.===>.
Plan    .===>.
Steplib .===>.
        .===>.
Parms   .===>.
Again   .===>.

26  (Translator Name)
        28  (DB2 Plan)
        30  .(Full Name, No Quotes)
        32  .(Full Name, No Quotes)
        34  .(Translator Parms)
        36  .(Yes/No, Default=Yes)

914C/G 361 1 5 15        ADATSAGT  KBD   a    Printing

*FIG. 1*

TEST FACILITY
COMMAND  ===>.
Enter/Verify EDI Parameters Below:

Input   .=t=>.AAAP.EDI.I.XPCWMRT       .(Full Name, No Quotes)
Work    .===>.DAMMSBG.WORK              .(Full Name, No Quotes)
Segment.===>.DAMMSBG.SEGMENT     48    .(Full Name, No Quotes)
Log     .=f=>.DAMMSBG.LOG               .(Full Name, No Quotes)

Sgmt   Error
Number Explanation
xxxxxxxxxxxxxxxxxxxxxxxx BOTTOM OF DATA xxxxxxxxxxxxxxxxxxxxxxxx 914C/G 361 1 5 16        ADATSAGL       a    Printing

*FIG. 2*

```
─────────────────────────── TEST FACILITY ──── ^TRANSLATION INCOMPLETE^
COMMAND    ===)^  /-12                              ^SCROLL ===)^PAGE^
Enter/Verify EDI Parameters Below:
           44
Input     ^==)^DAMMKMM.FB.DATA              ^(Full Name, No Quotes)
Work      ^===)^DACCJBM.WORK                ^(Full Name, No Quotes)
Segment^===)^DACCJBM.SEGMENT                ^(Full Name, No Quotes)
Log       ^===)^DACCJBM.LOG                 ^(Full Name, No Quotes)
50
  Sgmt    Error /-52
Number  Explanation
000003^^ERR14 ,Bad sql return code -924..
xxxxxxxxxxxxxxxxxxxxxxxx BOTTOM OF DATA xxxxxxxxxxxxxxxxxxxxxxxxx . . . . . . . . . . . . . . . . . . . . . . . . . . . . . . . . . . . . . .
914C/G  361 1 5 16        ADATSAIY      a      Printing      11:06:28
```

*FIG. 3*

```
                        56                  54
                        |                   |
 ┌──────────────────────────────────────────────────────────────────┐
 │ EDIT ──────── DACCJBM.SEGMENT ─────────────────── COLUMNS 001 072^│
 │ COMMAND ===>^          58                         ^SCROLL ===>^CSR^│
 │ RESULTS OF TRANSLATION:/  62          64                          │
 │ Standard:^ANSI  60 ^Release:^00200^Version:^002001  ^Agency:^X ^  │
 │      Last Segment Processed Successfully:^000002^          66     │
 │ 70─ Reason:^ERR14 ,Bad sql return code -924.. 68                  │
 │ Correct Identified Errors And Hit PF3 To Retranslate ─72          │
 │ ─────────────────────────────────────────────────────────────── ^ │
 │                                                                   │
 │ xxxxxxxxxxxxxxxxxxxxxxxxxxxx TOP OF DATA xxxxxxxxxxxxxxxxxxxxxxxxx│
 │ 000001^ISA*00*       *00*       *01*009122532    *01*007321904   *91│
 │ 000002^GS*PO*153647706*007321904*910806*1937*1189*X*002001^      │
 │ 000003^ST*850*8114065^                                            │
 │ 000004^BEG*00*SA*38114065*91080691-29A^                       │
 │ 000005^TAX*03-04737-006***********3^                              │
 │ 000006^N1*BY*COLORADO TELECOMMUNICATION DIV*92*38010000^          │
 │ 000007^PER*BD*GARY THOMSEN*TE*719-531-4248^                       │
 │ 000008^N1*AK*COLORADO TELECOMMUNICATION DIV*92*38010101^          │
 │ 000009^N1*ST*COLORADO TELECOMMUNICATION DIV*92*38010201^          │
 │ 000010^N1*BT*COLORADO TELECOMMUNICATION DIV*92*38010001^          │
 │ 000011^N1*SE*TEXAS INSTRUMENTS INC^                               │
 │ 000012^PO1*1*900*EA*0.29**BP*1826-1439*VP*TLC555CP^               │
 │ 000013^SCH*900*EA****002*910930^                                  │
 │ 000014^TD5*O*92*09*****SB*WD*5^                                   │
 │ . . . . . . . . . . . . . . . . . . . . . . . . . . . . . . . . .│
 │ 914C/G 361 1 5 15       ADATSAIY      a    Printing    11:05:56   │
 └──────────────────────────────────────────────────────────────────┘
```

*FIG. 4*

ELECTRONIC DOCUMENT INTERCHANGE TEST FACILITY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to the methods and systems for testing the transmission of data and more particularly, to a method for testing the transmission of electronic data interchange (EDI) documents files.

BACKGROUND OF THE INVENTION

In recent years many companies, in trading with other companies, for the transmission and receipt or interchange of business information have come to use computerized systems known as electronic data interchange or EDI systems. EDI systems enjoy the particular advantage of having an established set of standards applicable to various types of business documents. For example, in an EDI system, an invoice has a defined format and, as a result, may be rapidly transmitted between trading partners as a compact data file from the sending trading partner's computer to the receiving trading partner's computer. To create the compact data files, an EDI operator must first translate the EDI documents. The EDI document files are compact data files that the receiving trading partner receives. These compact data files are translated back into documents by the receiving trading partner.

Applications for EDI methods and systems include business activities such as purchasing, accounts payable and accounts receivable functions, banking transactions, electronic funds transfer and other document transfers. Other EDI system applications include order filling and processing between trading partners. Not only is this helpful in buying and selling goods, but also trading partners that are transportation companies may use this information to maximize the efficiency of the transportation services they provide. By using EDI systems, a trucking company, for example, may easily keep track of the origin and destination of all of its shipments throughout its service region.

The format standards for EDI documents are generally loosely written so that they can satisfy a wide variety of user needs. Thus, for example, while an EDI invoice format may have well-defined data fields, several aspects of the EDI invoice are variable. As a result, trading partners who agree to use an EDI system may agree to the format of communication between them prior to conducting a business transaction, and thereafter communication between the trading partners has the potential to occur on an almost immediate basis.

Although EDI systems represent a significant improvement in business communications between trading partners, known EDI systems stand in need of improvement in document translation efficiency. A particular problem in the translation of EDI documents is the need to assure that the documents, as they are generated from various points within a trading partner, satisfy the EDI document format EDI requirements. This is particularly important in cases where failure to satisfy applicable EDI document format requirements causes the translation to be either significantly incorrect or fully prohibited. It is, therefore, important that the sending trading partner ascertain that all documents satisfy the information and format requirements of the receiving trading partner before the trading partner sends them.

Known methods of testing EDI document translations require that when a receiving trading partner encounters a transmission error, the sending partner must identify and correct the error and, then, resend a corrected test EDI document file. This process often requires numerous iterations and creates time lapses which strain productivity. Correcting translation errors using a conventional EDI editing system has not proven practical, because any adjustment in the data link of EDI transmission requires that every character following the modification be adjusted. This results in a significant amount of tedious effort between both trading partners. This type of batch processing by the recipient is further limited, because only upon the detection of an error by the recipient can action be taken to correct the problem. Once this problem is corrected, it is necessary to completely rerun the file which may be halted again as a result of yet another error later in the EDI document file translation.

As a result, in order for EDI document transmissions to reach their full potential efficiency and speed there is a need for as a method and system for rapidly increasing the data translation rate between trading partners, it is necessary to have a rapid EDI translation test facility that does not strain the productivity of the receiving trading partner.

There is a need for a method and system that eliminates the batch processing necessary to identify errors in EDI translations.

There is yet the need for a method and system that permits EDI system operators to identify and correct EDI transmission errors without the need to begin again the EDI document file translation process.

SUMMARY OF THE INVENTION

The present invention, accordingly, provides an electronic data interchange testing method and system that overcomes the problems and satisfies the needs previously considered.

According to one aspect of the invention, there is provided a method for pre-production translation testing of EDI document files that comprises the steps of generating a plurality of control displays for controlling the pre-production translation of the EDI document file. Next, translation of the file takes place until a translation error arises. The method of the present invention is to display the translation error on one of the control displays so that the error may be corrected using an input to the control display. The next step is to correct the displayed translation error as indicated by the control display. This process of translating the file until a translation error arises, displaying the translation error for correction, and correcting the translation error continues until the EDI file is fully translated.

According to another aspect of the invention, there is provided within one of the control displays a plurality of initial queries for inputting initialization data pertaining to the EDI document file. The queries relate to the particular translation configuration for translating the data into a particular application program that has the ability to use the EDI document file. Moreover, a particularly attractive aspect of the invention is its ability to produce textual segment files for containing in textual form predetermined segments of the EDI file and permitting an operator to edit the textual segment file in response to the indicated translation error. Once all errors have been noted and a translation of the relevant section is complete, the segment is stored in a working file. The working file contains all of the previously corrected segments. Through this segmented approach, the working file becomes a corrected copy of the original EDI document file. Hence, upon the complete translation of the original EDI document file, the operator has the original EDI document file and a working EDI document file that was created by the segmentation process.

A technical advantage of the present invention is that it permits EDI systems to realize their intended benefits by eliminating redundant data flows that occur in known systems when EDI document files have translation errors. The EDI test facility of the present invention provides the receiving trading partner the ability to perform pre-production translation testing of EDI document files just prior to their translation. As a result, the EDI document file is fully translated and any errors incurred during this process are logged and can be made available to the sending trading partner as advised corrections; thus minimizing unproductive time lapses and iterative communication cycles between trading partners.

Another advantage of the present invention is that it fully avoids the batch processing that was heretofore necessary in the detecting EDI transmission file errors. Using the method and system of the present invention, a trading partner may employ the EDI test facility to correct interactively EDI document file transmission errors. This allows the trading partner to perform a single EDI document file translation and therefrom produce an error-free translated EDI document file. Because only one translation operation is necessary to produce the error-free EDI document file, the present invention eliminates much of the tedious work and productivity strain presently existing in EDI document file translation.

Yet another advantage of the present invention is that it permits the integration of numerous EDI application programs for error correction and translation. The integration that the present invention provides is functionally transparent to the operator and permits EDI document file translation with any type of translator. The solution that the preferred embodiment provides permits changing the test process from one in which a number of inadequate or unrelated tools are used for EDI translation to a process where an integrated and easy to use tool kit exists to aid the EDI translation operator. As a result, the interactive testing that the preferred embodiment provides significantly reduces transmission testing cycle time. This reduces software development costs and improves overall productivity in EDI document file applications among trading partners.

BRIEF DESCRIPTION OF THE DRAWINGS

The invention and its modes of use and advantages are best understood by reference to the following description of illustrative embodiments when read in conjunction with the accompanying drawings, wherein:

FIG. 1 through 4 are various translation screens usable in a association with the preferred embodiment;

DETAILED DESCRIPTION OF THE INVENTION

Figure 5:
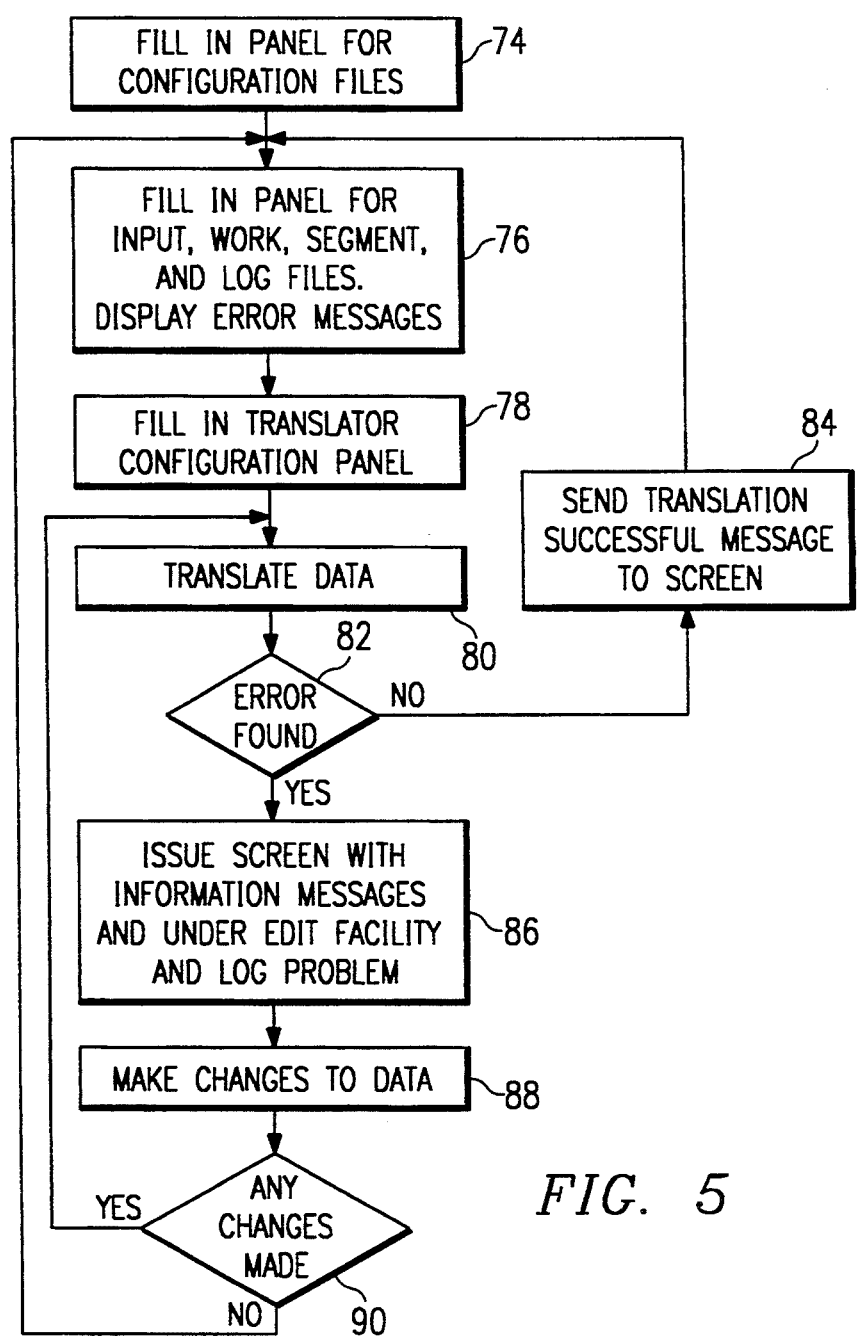
FIG. 5 is a flow chart illustrating the operation of the EDI test facility of the preferred embodiment; and APPENDIX A provides a listing of the software code that the preferred embodiment of the present invention implements for EDI document file translation testing.

The preferred embodiment of the present invention is best understood by referring to the FIGUREs wherein like numerals are used for like and corresponding parts of the various drawings.

The EDI test facility of the preferred embodiment integrates within the EDI system environment an operator interactive translation test facility that is accessible through a computer time share option link. In this environment, the EDI test facility of the preferred embodiment has numerous test configuration options. The EDI test facility of the preferred embodiment integrates its operation with the principal communication path among EDI partners for EDI transmissions known as the EDI system gateway. This permits an EDI system operator to locate and select an EDI transmission file for immediate translation testing. Once translation testing has commenced, error situations are brought to the operator's attention along with recommendations for correcting the error. The operator has the option to fix the error and continue testing until the translator detects another translation error. As translation testing continues, the test results are saved into a working file. The working file may be tested to verify a successful translation. Additionally, the preferred embodiment generates a log file to provide the operator with a listing of errors encountered during translation testing.

The EDI test facility may be used on any computer equipped to perform EDI translations and may operate in conjunction with any commercially available EDI translator software package. Examples of translator packages usable with the preferred embodiment include the following: transettlements, interbridge and proprietary translators.

To use the EDI test facility of the preferred embodiment, the operator may enter a time sharing option and receive an EDI document file on which to perform testing. To perform the operation, the EDI test facility of the preferred embodiment presents the operator with a set of operator friendly panels. FIGS. 1–4 illustrate the panels or screens that the operator sees in testing EDI document file for translation errors. In particular, FIG. 1 illustrates the "Translator Configuration Screen" that the preferred embodiment provides to the EDI translation test operator. The Translator Configuration Screen of FIG. 1, as indicated by Translator Configuration label 10, permits the operator to input a Command for EDI translation at point 12 of the screen, the EDI translator program that the operator will use at point 14, the EDI translation plan at point 16, the EDI Steplib, at points 18 and 20, EDI parms at point 22, and at point 24 the ability to respond to a query of whether a translation identified at points 14–22 as being translated again.

The EDI Steplib input defines a library associated with the test facility wherein the translator program resides, and the EDI parms input receives the parameters that the operator desires to pass to the translator program. The operator may provide these Translator Configuration Screen inputs to the EDI test facility of the preferred embodiment using a key board or other computer input device.

Associated with each of the inputs of points 14–24 are respective parameter descriptors. In particular, for the Program input point 14, the preferred embodiment indicates at point 26 that the proper response to the program input 14 is the "Translator Name." For the EDI plan input 16, the "DB2 Plan" parameter descriptor 28 means that for this particular translator, the DB2 plan is used. For Steplib inputs 28 and 20, descriptors 30 and 32 specify that the "Full Name" of the Steplib is necessary and that no quotes may be used. Parms input 22 must be Translated Parms, as descriptor 34 indicates. The appropriate response for the "Again" input 24 is "yes" or "no" with a default to "yes" as indicated by descriptor 36.

Once the operator establishes the translator configuration by appropriately responding to the Translator Configuration Screen of FIG. 1, the operator indicates the completion of this step by hitting the enter key. Test Facility Screen of FIG. 2 appears. Immediately thereafter, identifies Test Facility label 38 the Test Facility Screen. With this screen, the operator may input a command at point 12 and set up particular files necessary to perform the EDI document file transmission testing. For example, in the preferred embodiment, the operator provides to the EDI Test Facility the input file at point 40. In this example, the input file has the name, ".AAA.EDI.I.EXPCWMRT." The operator defines a work file at point 42 (e.g., ".DAMMSBG.WORK"), a segment file at point 44 (e.g., ".DAMMSBG.SEGMENT"), and a log file (e.g., "DAMMSBG.LOG") at point 46. The Test Facility Screen also assists the operator by describing the types of fields necessary at points 40–46 by the input descriptors 48 which appear as ".(Full Name, No Quotes)."

In response to this information and a subsequent command that the operator inputs at point 12, the Test Facility Screen can display the existence of a translation error. FIG. 3 shows the Test Facility screen that appears during translation testing. FIG. 3 shows outputs at Segment Number designator 50 and Error Explanation output 52 to provide indication of errors. In the example, the segment number where an error exists is segment number "000003" having an associated error code of "EER14" and an explanation of "Bad Sql Return Code - 924." This means that at segment number 000003 there was a DB2 problem in the EDI document file translation. With this error identifying information, the operator may insert an "Edit" command into the Command input point 12 of the Test Facility Screen to see the Edit Screen that appears at FIG. 4.

The preferred embodiment of the present invention, upon identifying the translation error, places a segment of the original input file that contains the translation error into a segment file. The segment file, in the example of the preferred embodiment, is identified at point 44 of the Test Facility Screens of FIGS. 2 and 3 and the Edit Screen designator 54. The Edit Screen designator 54 shows that the segment file name is "DACCJBM.SEGMENT." The Edit Label 56 indicates to the operator that the operator is viewing the Edit Screen.

In the Edit Screen, as in the Translator Configuration Screen of FIG. 1 and the Test Facility Screen of FIGS. 2 and 3, command input 12 permits the operator to provide a command input. Other outputs of the Edit Screen include descriptive output of the results of the translation at output point 58, the Standard for translation at point 60 (e.g., "ANSI") the Release descriptor at output point 62, (e.g., "00200"), the applicable Version at output point 64 (e.g., "002001"), and the particular Agency for output at point 66 (e.g., "X"). Because of the "Last Segment Process Successfully" output point 68, the operator at all times knows the last segment that was successfully processed. At the "Reason" output point 70, the operator receives the same information that previously appeared at Error Explanation output 52 of the Test Facility Screen shown in FIG. 3. This provides as the reason why the translation error occurred. Finally, the operator is prompted to "Correct Identified Errors And Hit PF3 to retranslate the corrected segment (e.g., segment 3 in this example).

The bottom part of the operator screen appearing at FIG. 4 shows the portion of the original EDI document file that the segment file contains. With this small segment, the operator may identify the error that the Test Facility Search lists and correct it. After which, the operator may depress the PF3 key of his keyboard to retranslate the segment and thereby verify that the error has been corrected.

In using the EDI Test Facility of the preferred embodiment, at each segment that the test facility identifies, the Test Facility output of FIG. 3 and the Edit Screen output of FIG. 4 communicate to the operator the existence of an error and the error location, as well as provide to the operator the ability to correct the error interactively. Once the error is corrected, the operator retranslates the corrected segment and the EDI Test Facility of the preferred embodiment continues to translate the EDI document file (e.g., DAMMKMM.FB.DATA of FIG. 3) until the translation is complete.

The Translation Incomplete signal 53 of FIG. 3 indicates that the translation of input file DAMMKMM.FBDATA is not completed because of the error identified by segment number output 50 and error explanation output 52 (i.e., "ERR14, Badsql Return Code - 924 at segment 000003).

FIG. 5 shows a flow chart of the preferred EDI Test Facility embodiment to provide to the operator the screens appearing in FIG. 1–4. First the operator fills in the Transfer Configuration Screen to establish the configuration files of step 74. Next, the operator fills in the test facility panel for input, work, segment, and log files at step 76. Also at step 76, using the Test Facility screens of FIGS. 2 and 3 the EDI Test Facility of the preferred embodiment displays any error messages arising from the EDI translation. Next, the EDI Test Facility of the preferred embodiment at step 78 permits the operator to fill in the translator configuration of FIG. 1. The preferred embodiment then translates the data at step 80 and queries whether an error has been found in the EDI file translation at step 82.

If no error occurs, the preferred embodiment sends a translation successful message to the Test Facility screen at step 84 and then permits the operator to change the input work segment and log files and continue at steps 76 and the Translator Configuration of step 78. On the other hand, if an error is found at step 82, EDI test facility of the preferred embodiment at step 86, issues the information to the Test Facility Screen (see FIG. 3) and provides the operator with the ability to use the Edit Facility of the preferred embodiment. At step 86, the preferred embodiment also logs the problem in the previously designated log file (see FIG. 3).

Under the edit facility, the EDI Test Facility permits the operator to make changes to the data at step 88 and query whether any changes were made at step 90. If no changes were made, control returns to step 76 where the operator is to fill in the input, work, segment, and log file as well as to display the error message arising from the failed translation. On the other hand, if changes are made then the program control returns to step 80 to translate data and determine whether any further error exists.

Appendix A provides a complete listing of the source code for the EDI Test Facility of the preferred embodiment.

Although the present invention and its advantages have been described in detail, it should be understood that various changes, substitutions and alterations can be made herein without departing from the spirit and scope the invention as defined in the appended claims.

APPENDIX A

```
          TITLE 'EDITSBED - EDI TEST FACILITY'                          00010000
          SPACE 2                                                       00020000
*****************************************************************      00030000
*---------------------------------------------------------------*      00040000
*              -----   N O T I C E   -----                      *      00050000
*       THIS EDI TEST FACILITY SOURCE MODULE                    *      00060000
*                  IS TI CLASSIFIED:                            *      00070000
*  T E X A S   I N S T R U M E N T S   I N T E R N A L   D A T A *    00080000
*  P R O P E R T Y   O F   T E X A S   I N S T R U M E N T S    *      00090000
*                    O N L Y                                    *      00100000
*                TEXAS INSTRUMENTS, INC.                        *      00110000
*       13500 N. CENTRAL EXPRESSWAY, DALLAS, TEXAS   75265      *      00120000
*---------------------------------------------------------------*      00130000
*****************************************************************      00140000
          SPACE 2                                                       00150000
          REGS                                                          00160000
          SPACE 2                                                       00170000
          IHASDWA                                                       00180000
          SPACE 2                                                       00190000
          EDIDEQU                                                       00200000
          SPACE 2                                                       00210000
          CVT   DSECT=YES                                               00220000
          TICVT                                                         00230000
          SPACE 2                                                       00240000
          IFGACB                                                        00250000
          SPACE 2                                                       00260000
          IFGRPL                                                        00270000
          SPACE 2                                                       00280000
          IEFZB4D0                                                      00290000
          SPACE 2                                                       00300000
          IEFZB4D2                                                      00310000
          SPACE 2                                                       00320000
          DCBD  DSORG=BS,DEVD=DA                                        00330000
          SPACE 2                                                       00340000
DCBPARMS  DSECT                                                         00350000
DCBXDDNM  DS    CL8                                                     00360000
DCBXRFMT  DS    X                                                       00370000
DCBXLREC  DS    XL2                                                     00380000
DCBXBLKS  DS    XL2                                                     00390000
DCBXPRIM  DS    XL3                                                     00400000
DCBXNEW   EQU   DCBPARMS,*-DCBPARMS,C'X'                                00410000
TRANREC   DSECT                                                         00420000
TRANSTND  DS    CL8                                                     00430000
TRANRLSE  DS    CL5                                                     00440000
TRANVERS  DS    CL12                                                    00450000
TRANAGCY  DS    CL2                                                     00460000
TRANSDLM  DS    CL1                                                     00470000
TRANREAS  DS    CL71                                                    00480000
TRANBIF   DS    CL10                                                    00490000
TRANWELM  DS    CL8                                                     00500000
TRANLAST  DS    CL6                                                     00510000
TRANTAG   DS    CL20                                                    00520000
TRANVAL   DS    CL40                                                    00530000
TRANSTOR  EQU   TRANTAG,*-TRANTAG,C'C'                                  00540000
EDITSBED  CSECT                                                         00550000
          USING EDITSBED,R10         NOTE BASE ADDRESSIBILITY           00560000
          STM   R14,R12,12(R13)      SAVE ENTRY REGS                    00570000
          LR    R10,R15              COPY ENTRY ADDRESS                 00580000
          LA    R11,2048(,R10)       INITIALIZE 2ND BASE REG            00590000
          LA    R11,2048(,R11)                                          00600000

USING EDITSBED+4096,R11                                       00610000
          LA    R1,SAVEAREA          POINT TO SAVE AREA                 00620000
          ST    R13,4(,R1)           LINK TO CALLERS SAVE AREA          00630000
          ST    R1,8(,R13)           LINK TO OUR SAVE AREA              00640000
          LR    R13,R1               ESTABLISH SAVE AREA                00650000
          SPACE 1                                                       00660000
*---------------------------------------------------------------*      00670000
*         SET UP AN ESTAE EXIT                                  *      00680000
*---------------------------------------------------------------*      00690000
          SPACE 1                                                       00700000
          ESTAE TBABEND,             ESTABLISH AN ESTAE                +00710000
                PARAM=(R10),                                            +00720000
                XCTL=YES                                                00730000
          SPACE 1                                                       00740000
*---------------------------------------------------------------*      00750000
*         INITIALIZE                                            *      00760000
```

```
*--------------------------------------------------------------*  00770000
                                                                  00780000
       SPACE 1                                                    00790000
       OI    FLAG1,INIT         SET INITIALIZING                  00800000
       USING IHADCB,R12                                           00810000
       SPACE 1                                                    00820000
       LOAD  EP=ISPLINK         LOAD LINK PROGRAM                 00830000
       SPACE 1                                                    00840000
       ST    R0,ISPLADDR        SAVE ADDRESS                      00850000
       SPACE 1                                                    00860000
*--------------------------------------------------------------*  00870000
*      DEFINE PROCESSSING OPTIONS FOR DIALOGUE SERVICE         *  00880000
*--------------------------------------------------------------*  00890000
       SPACE 1                                                    00900000
       L     R15,ISPLADDR       LOAD ADDRESS OF ISPLINK ROUTINE   00910000
       CALL  (15),(CONTROL,ERRORS,RETURN),VL                      00920000
       SPACE 1                                                    00930000
*--------------------------------------------------------------*  00940000
*      DEFINE MISC. VARIABLE NAMES TO ISPF                     *  00950000
*--------------------------------------------------------------*  00960000
       SPACE 1                                                    00970000
       L     R15,ISPLADDR       LOAD ADDRESS OF ISPLINK ROUTINE   00980000
       CALL  (15),(VDEFINE,ZUSERLIT,ZUSER,CHAR,LENGTH8),VL        00990000
       SPACE 1                                                    01000000
       L     R15,ISPLADDR       LOAD ADDRESS OF ISPLINK ROUTINE   01010000
       CALL  (15),(VDEFINE,DSNLIT,DSN,CHAR,LENGTH44),VL           01020000
       SPACE 1                                                    01030000
       L     R15,ISPLADDR       LOAD ADDRESS OF ISPLINK ROUTINE   01040000
       CALL  (15),(VDEFINE,DSNWLIT,DSNW,CHAR,LENGTH44),VL         01050000
       SPACE 1                                                    01060000
       L     R15,ISPLADDR       LOAD ADDRESS OF ISPLINK ROUTINE   01070000
       CALL  (15),(VDEFINE,DSNALITT,DSNAT,CHAR,LENGTH44),VL       01080000
       SPACE 1                                                    01090000
       L     R15,ISPLADDR       LOAD ADDRESS OF ISPLINK ROUTINE   01100000
       CALL  (15),(VDEFINE,DSNALITP,DSNAP,CHAR,LENGTH44),VL       01110000
       SPACE 1                                                    01120000
       L     R15,ISPLADDR       LOAD ADDRESS OF ISPLINK ROUTINE   01130000
       CALL  (15),(VDEFINE,DSNCLITT,DSNCT,CHAR,LENGTH44),VL       01140000
       SPACE 1                                                    01150000
       L     R15,ISPLADDR       LOAD ADDRESS OF ISPLINK ROUTINE   01160000
       CALL  (15),(VDEFINE,DSNCLITP,DSNCP,CHAR,LENGTH44),VL       01170000
       SPACE 1                                                    01180000
       L     R15,ISPLADDR       LOAD ADDRESS OF ISPLINK ROUTINE   01190000
       CALL  (15),(VDEFINE,DSNILITT,DSNIT,CHAR,LENGTH44),VL       01200000
       SPACE 1                                                    01210000
       L     R15,ISPLADDR       LOAD ADDRESS OF ISPLINK ROUTINE   01220000
       CALL  (15),(VDEFINE,DSNILITP,DSNIP,CHAR,LENGTH44),VL       01230000
       SPACE 1                                                    01240000
       L     R15,ISPLADDR       LOAD ADDRESS OF ISPLINK ROUTINE   01250000
       CALL  (15),(VDEFINE,DSNXLITT,DSNXT,CHAR,LENGTH44),VL       01260000
       SPACE 1                                                    01270000
       L     R15,ISPLADDR       LOAD ADDRESS OF ISPLINK ROUTINE   01280000
       CALL  (15),(VDEFINE,DSNXLITP,DSNXP,CHAR,LENGTH44),VL       01290000
       SPACE 1                                                    01300000
       L     R15,ISPLADDR       LOAD ADDRESS OF ISPLINK ROUTINE   01310000
       CALL  (15),(VDEFINE,DSNOLITT,DSNOT,CHAR,LENGTH44),VL       01320000
       SPACE 1                                                    01330000
       L     R15,ISPLADDR       LOAD ADDRESS OF ISPLINK ROUTINE   01340000
       CALL  (15),(VDEFINE,DSNOLITP,DSNOP,CHAR,LENGTH44),VL       01350000
       SPACE 1                                                    01360000
       L     R15,ISPLADDR       LOAD ADDRESS OF ISPLINK ROUTINE   01370000
       CALL  (15),(VDEFINE,DSNSLIT,DSNS,CHAR,LENGTH44),VL         01380000
       SPACE 1                                                    01390000
       L     R15,ISPLADDR       LOAD ADDRESS OF ISPLINK ROUTINE   01400000
       CALL  (15),(VDEFINE,DSNLLIT,DSNL,CHAR,LENGTH44),VL         01410000
       SPACE 1                                                    01420000
       L     R15,ISPLADDR       LOAD ADDRESS OF ISPLINK ROUTINE   01430000
       CALL  (15),(VDEFINE,STDLIT,STD,CHAR,LENGTH8),VL            01440000
       SPACE 1                                                    01450000
       L     R15,ISPLADDR       LOAD ADDRESS OF ISPLINK ROUTINE   01460000
       CALL  (15),(VDEFINE,RLSLIT,RLS,CHAR,LENGTH5),VL            01470000
       SPACE 1                                                    01480000
       L     R15,ISPLADDR       LOAD ADDRESS OF ISPLINK ROUTINE   01490000
       CALL  (15),(VDEFINE,VERSLIT,VERS,CHAR,LENGTH12),VL         01500000
       SPACE 1                                                    01510000
       L     R15,ISPLADDR       LOAD ADDRESS OF ISPLINK ROUTINE   01520000
       CALL  (15),(VDEFINE,AGCYLIT,AGCY,CHAR,LENGTH2),VL          01530000
       SPACE 1                                                    01540000
       L     R15,ISPLADDR       LOAD ADDRESS OF ISPLINK ROUTINE   01550000
       CALL  (15),(VDEFINE,REASLIT,REAS,CHAR,LENGTH71),VL         01560000
       SPACE 1                                                    01570000
       L     R15,ISPLADDR       LOAD ADDRESS OF ISPLINK ROUTINE   01580000
       CALL  (15),(VDEFINE,NUMBLIT,NUMB,CHAR,LENGTH6),VL          01590000
       SPACE 1                                                    01600000
       L     R15,ISPLADDR       LOAD ADDRESS OF ISPLINK ROUTINE   01610000
       CALL  (15),(VDEFINE,LASTLIT,LASTSEG,CHAR,LENGTH6),VL       01620000
       SPACE 1                                                    01630000
       L     R15,ISPLADDR       LOAD ADDRESS OF ISPLINK ROUTINE   01640000
       CALL  (15),(VDEFINE,RTC,RTNCODE,HEX,LENGTH4),VL            01650000
       SPACE 1                                                    01660000
       L     R15,ISPLADDR       LOAD ADDRESS OF ISPLINK ROUTINE   01670000
       CALL  (15),(VDEFINE,REEZ,REEZCODE,HEX,LENGTH2),VL
```

```
               SPACE 1                                                  01680000
               L       R15,ISPLADDR       LOAD ADDRESS OF ISPLINK ROUTINE 01690000
               CALL    (15),(VDEFINE,DD,DDERR,CHAR,LENGTH8),VL           01700000
               SPACE 1                                                  01710000
*----------------------------------------------------------------------* 01720000
*              CREATE TABLE NEEDED FOR FIRST PANEL                     * 01730000
*----------------------------------------------------------------------* 01740000
               SPACE 1                                                  01750000
               L       R15,ISPLADDR       LOAD ADDRESS OF ISPLINK ROUTINE 01760000
               CALL    (15),(TBCREATE,VARTABLE,,VARLIST,NOWRITE),VL     01770000
               SPACE 1                                                  01780000
               LTR     R15,R15            ERROR?                        01790000
               BNZ     ERROR01            YES-                          01800000
               SPACE 1                                                  01810000
*----------------------------------------------------------------------* 01820000
*              RETRIEVE TSO USERID                                     * 01830000
*----------------------------------------------------------------------* 01840000
               SPACE 1                                                  01850000
               L       R15,ISPLADDR       LOAD ADDRESS OF ISPLINK ROUTINE 01860000
               CALL    (15),(VGET,USERLIST,SHARED),VL                   01870000
               SPACE 1                                                  01880000
*----------------------------------------------------------------------* 01890000
*              ALLOCATE DISP=SHR DATASETS NEEDED BY TRANSLATOR         * 01900000
*----------------------------------------------------------------------* 01910000
               SPACE 1                                                  01920000
               MVI     DYNRB+S99VERB-S99RB,S99VRBAL SET TO ALLOCATE     01930000
               LA      R2,DSLISTS         POINT TO DATASET LIST         01940000
               USING   DCBPARMS,R2        GET ADDRESSABILITY            01950000
DSLISTSX       DS      0H                                               01960000
               LA      R1,DSALLOCS        POINT TO TEXT UNIT LIST       01970000
               ST      R1,DYNRB+S99TXTPP-S99RB STORE ADDRESS IN REQUEST BLK 01980000
               CLI     0(R2),C' '         END OF LIST?                  01990000
               BE      ALLOCOLD           YES-                          02000000
               MVC     TXTDD+S99TUPAR-S99TUNIT(3),DCBXDDNM SET DDNAME   02010000
               MVC     TXTDSN+S99TUPAR-S99TUNIT(44),=CL44' ' BLANK OUT DSN 02020000
               MVC     TXTDSN+S99TUPAR-S99TUNIT(L'ZUSER),ZUSER COPY TSO USERID 02030000
               LA      R15,TXTDSN+S99TUPAR-S99TUNIT POINT TO WORK AREA  02040000
               LA      R14,44             SET COUNT                     02050000
FINDBLNX       DS      0H                                               02060000
               CLI     0(R15),C' '        FIND FIRST BLANK              02070000
               BE      FOUNDBLX           FOUND IT-                     02080000
               LA      R15,1(R15)         POINT TO NEXT BYTE            02090000
               BCT     R14,FINDBLNX                                     02100000
FOUNDBLX       DS      0H                                               02110000
               MVC     0(4,R15),=CL4'.TF.' SET MIDDLE NODE              02120000
               LA      R15,4(R15)         INCREMENT POINTER             02130000
               MVC     0(8,R15),DCBXDDNM  SET REST OF DSN               02140000
               BAL     R9,DYNA            GO ALLOC FILE                 02150000
               B       CKERRORX           ERROR ON ALLOCATION           02160000
NEXTLISS       DS      0H                                               02170000
               LA      R2,L'DCBXNEW(R2)   POINT TO NEXT ENTRY           02180000
               B       DSLISTSX           CONTINUE                      02190000
CKERRORX       DS      0H                                               02200000
               CLC     =XL2'1708',DYNRB+S99ERROR-S99RB LOCATE ERROR?    02210000
               BNE     ERROR02            NO-                           02220000
               LA      R1,DSALLOCN        POINT TO TEXT UNIT LIST       02230000
               ST      R1,DYNRB+S99TXTPP-S99RB STORE ADDRESS IN REQUEST BLK 02240000
               MVC     TXTRECFM+S99TUPAR-S99TUNIT(L'DCBXRFMT),DCBXRFMT  02250000
               MVC     TXTLRECL+S99TUPAR-S99TUNIT(L'DCBXLREC),DCBXLREC  02260000
               MVC     TXTBLKSZ+S99TUPAR-S99TUNIT(L'DCBXBLKS),DCBXBLKS  02270000
               MVC     TXTPRIME+S99TUPAR-S99TUNIT(L'DCBXPRIM),DCBXPRIM  02280000
               BAL     R9,DYNA            GO ALLOC FILE                 02290000
               B       ERROR02            ERROR ON ALLOCATION           02300000
               B       NEXTLISS           CONTINUE                      02310000
               DROP    R2                                               02320000
               SPACE 1                                                  02330000
*----------------------------------------------------------------------* 02340000
*              ALLOCATE DISP=OLD DATASETS NEEDED BY TRANSLATOR         * 02350000
*----------------------------------------------------------------------* 02360000
               SPACE 1                                                  02370000
ALLOCOLD       DS      0H                                               02380000
               MVI     DYNRB+S99VERB-S99RB,S99VRBAL SET TO ALLOCATE     02390000
               LA      R2,DSLISTO         POINT TO DATASET LIST         02400000
               USING   DCBPARMS,R2        GET ADDRESSABILITY            02410000
DSLISTOX       DS      0H                                               02420000
               LA      R1,DSALLOCO        POINT TO TEXT UNIT LIST       02430000
               ST      R1,DYNRB+S99TXTPP-S99RB STORE ADDRESS IN REQUEST BLK 02440000
               CLI     0(R2),C' '         END OF LIST?                  02450000
               BE      ALLOCSO            YES-                          02460000
               MVC     TXTDD+S99TUPAR-S99TUNIT(8),DCBXDDNM SET DDNAME   02470000
               MVC     TXTDSN+S99TUPAR-S99TUNIT(44),=CL44' ' BLANK OUT DSN 02480000
               MVC     TXTDSN+S99TUPAR-S99TUNIT(L'ZUSER),ZUSER COPY TSO USERID 02490000
               LA      R15,TXTDSN+S99TUPAR-S99TUNIT POINT TO WORK AREA  02500000
               LA      R14,44             SET COUNT                     02510000
FINDBLNK       DS      0H                                               02520000
               CLI     0(R15),C' '        FIND FIRST BLANK              02530000
               BE      FOUNDBLK           FOUND IT-                     02540000
               LA      R15,1(R15)         POINT TO NEXT BYTE            02550000
               BCT     R14,FINDBLNK                                     02560000
FOUNDBLK       DS      0H                                               02570000
               MVC     0(4,R15),=CL4'.TF.' SET MIDDLE NODE              02580000
```

```
                LA      R15,4(R15)              INCREMENT POINTER                   02590000
                MVC     0(8,R15),DCBXDDNM       SET REST OF DSN                     02600000
                BAL     R9,DYNA                 GO ALLOC FILE                       02610000
                B       CKERROR                 ERROR ON ALLOCATION                 02620000
NEXTLISO        DS      0H                                                          02630000
                LA      R2,L'DCBXNEW(R2)        POINT TO NEXT ENTRY                 02640000
                B       DSLISTOX                CONTINUE                            02650000
CKERROR         DS      0H                                                          02660000
                CLC     =XL2'1708',DYNRB+S99ERROR-S99RB LOCATE ERROR?                02670000
                BNE     ERROR02                 NO-                                 02680000
                LA      R1,DSALLOCN             POINT TO TEXT UNIT LIST             02690000
                ST      R1,DYNRB+S99TXTPP-S99RB STORE ADDRESS IN REQUEST BLK         02700000
                MVC     TXTRECFM+S99TUPAR-S99TUNIT(L'DCBXRFMT),DCBXRFMT              02710000
                MVC     TXTLRECL+S99TUPAR-S99TUNIT(L'DCBXLREC),DCBXLREC              02720000
                MVC     TXTBLKSZ+S99TUPAR-S99TUNIT(L'DCBXBLKS),DCBXBLKS              02730000
                MVC     TXTPRIME+S99TUPAR-S99TUNIT(L'DCBXPRIM),DCBXPRIM              02740000
                BAL     R9,DYNA                 GO ALLOC FILE                       02750000
                B       ERROR02                 ERROR ON ALLOCATION                 02760000
                B       NEXTLISO                CONTINUE                            02770000
                DROP    R2                                                          02780000
                SPACE   1                                                           02790000
*---------------------------------------------------------------*                   02800000
*               ALLOCATE SYSOUT NEEDED BY TRANSLATOR             *                   02810000
*---------------------------------------------------------------*                   02820000
                SPACE   1                                                           02830000
ALLOCSO         DS      0H                                                          02840000
                LA      R1,SOALLOC              POINT TO TEXT UNIT LIST             02850000
                ST      R1,DYNRB+S99TXTPP-S99RB STORE ADDRESS IN REQUEST BLK         02860000
                MVI     DYNRB+S99VERB-S99RB,S99VRBAL SET TO ALLOCATE                 02870000
                LA      R2,SOLIST               POINT TO SYSOUT LIST                02880000
SOLISTX         DS      0H                                                          02890000
                CLI     0(R2),C' '              END OF LIST?                        02900000
                BE      GETVARS                 YES-                                02910000
                MVC     TXTDD+S99TUPAR-S99TUNIT(8),0(R2) COPY DDNAME                 02920000
                BAL     R9,DYNA                 GO ALLOC DATABASE                   02930000
                B       ERROR02                 ERROR ON ALLOCATION                 02940000
                LA      R2,8(R2)                POINT TO NEXT DDNAME                02950000
                B       SOLISTX                 CONTINUE                            02960000
                SPACE   1                                                           02970000
*---------------------------------------------------------------*                   02980000
*               RETRIEVE PANEL VARIABLES FOR DISPLAY             *                   02990000
*---------------------------------------------------------------*                   03000000
                SPACE   1                                                           03010000
GETVARS         DS      0H                                                          03020000
                L       R15,ISPLADDR            LOAD ADDRESS OF ISPLINK ROUTINE     03030000
                CALL    (15),(VGET,SAVLIST,PROFILE),VL                              03040000
                SPACE   1                                                           03050000
*---------------------------------------------------------------*                   03060000
*               DISPLAY CONFIGURATION PANEL TO GET FILE NAMES    *                   03070000
*---------------------------------------------------------------*                   03080000
                SPACE   1                                                           03090000
CONFIG          DS      0H                                                          03100000
                LA      R1,DSUNCONC             POINT TO TEXT UNIT LIST             03110000
                ST      R1,DYNRB+S99TXTPP-S99RB STORE ADDRESS IN REQUEST BLK         03120000
                MVI     DYNRB+S99VERB-S99RB,S99VRBDC SET TO UNALLOCATE               03130000
                LA      R2,DSLIST               POINT TO DS LIST                    03140000
UNCONC          DS      0H                                                          03150000
                CLC     =C'VSAM',0(R2)          END OF LIST?                        03160000
                BE      UNALCONF                YES-                                03170000
                MVC     TXTDDU+S99TUPAR-S99TUNIT(8),0(R2) COPY DDNAME                03180000
                BAL     R9,DYNA                 GO UNCONCAT FILES                   03190000
                B       *+4                     ERROR ON UNCONCAT                   03200000
                LA      R2,104(R2)              POINT TO NEXT DDNAME                03210000
                B       UNCONC                  CONTINUE                            03220000
UNALCONF        DS      0H                                                          03230000
                LA      R1,DSUNALOC             POINT TO TEXT UNIT LIST             03240000
                ST      R1,DYNRB+S99TXTPP-S99RB STORE ADDRESS IN REQUEST BLK         03250000
                MVI     DYNRB+S99VERB-S99RB,S99VRBUN SET TO UNALLOCATE               03260000
                LA      R2,DSLIST               POINT TO DS LIST                    03270000
UNALDSX         DS      0H                                                          03280000
                CLI     0(R2),C' '              END OF LIST?                        03290000
                BE      DISPCONF                YES-                                03300000
                MVC     TXTDD+S99TUPAR-S99TUNIT(8),0(R2) COPY DDNAME                 03310000
                BAL     R9,DYNA                 GO UNALLOCATE FILE                  03320000
                B       *+4                     ERROR ON UNALLOCATION               03330000
                LA      R2,52(R2)               POINT TO NEXT DDNAME                03340000
                B       UNALDSX                 CONTINUE                            03350000
                SPACE   1                                                           03360000
DISPCONF        DS      0H                                                          03370000
                L       R15,ISPLADDR            LOAD ADDRESS OF ISPLINK ROUTINE     03380000
                CALL    (15),(DISPLAY,PANEL3),VL DISPLAY                            03390000
                SPACE   1                                                           03400000
                CH      R15,=H'8'               END/RETURN ENTERED?                 03410000
                BE      ENDSESS                 YES-                                03420000
                NI      FLAG1,FF-INIT           RESET INIT FLAG                     03430000
                SPACE   1                                                           03440000
*---------------------------------------------------------------*                   03450000
*               ALLOCATE DISP=SHR DATASETS NEEDED BY TRANSLATOR  *                   03460000
*---------------------------------------------------------------*                   03470000
```

```
                SPACE 1
                LA      R1,DSALLOCS         POINT TO TEXT UNIT LIST             03480000
                ST      R1,DYNRB+S99TXTPP-S99RB STORE ADDRESS IN REQUEST BLK     03490000
                MVI     DYNRB+S99VERB-S99RB,S99VRBAL SET TO ALLOCATE             03500000
                LA      R2,DSLIST           POINT TO DATASET LIST                03520000
DSLISTX         DS      0H                                                       03530000
                CLI     0(R2),C' '          END OF LIST?                         03540000
                BE      CONCLIST            YES-                                 03550000
                MVC     TXTDD+S99TUPAR-S99TUNIT(8),0(R2) COPY DDNAME             03560000
                MVC     TXTDSN+S99TUPAR-S99TUNIT(44),8(R2) COPY DS NAME          03570000
                BAL     R9,DYNA             GO ALLOC FILE                        03580000
                B       ERROR02             ERROR ON ALLOCATION                  03590000
                LA      R2,52(R2)           POINT TO NEXT DATASET NAME           03600000
                B       DSLISTX             CONTINUE                             03610000
CONCLIST        DS      0H                                                       03620000
                LA      R1,DSCONCLS         POINT TO TEXT UNIT LIST              03630000
                ST      R1,DYNRB+S99TXTPP-S99RB STORE ADDRESS IN REQUEST BLK     03640000
                MVI     DYNRB+S99VERB-S99RB,S99VRBCC SET TO ALLOCATE             03650000
                LA      R2,DSLIST           POINT TO DATASET LIST                03660000
CONCNEXT        DS      0H                                                       03670000
                CLC     =C'VSAM',0(R2)      END OF LIST?                         03680000
                BE      DISPPRIM            YES-                                 03690000
                MVC     TXTCONC+S99TUPAR-S99TUNIT(8),0(R2) COPY DDNAME           03700000
                LA      R2,52(R2)           POINT TO NEXT DDNAME                 03710000
                MVC     TXTCONCX,0(R2)      COPY SECOND DDNAME                   03720000
                BAL     R9,DYNA             GO ALLOC FILE                        03730000
                B       ERROR02             ERROR ON ALLOCATION                  03740000
                LA      R2,52(R2)           POINT TO NEXT DDNAME                 03750000
                B       CONCNEXT            CONTINUE                             03760000
                SPACE 1                                                          03770000
*---------------------------------------------------------------*                03780000
*               DISPLAY PRIMARY PANEL                           *                03790000
*---------------------------------------------------------------*                03800000
                SPACE 1                                                          03810000
DISPPRIM        DS      0H                                                       03820000
                LA      R12,LOGDCB          POINT TO LOG DCB                     03830000
                TM      DCBOFLGS,DCBOFOPN   IS IT OPEN?                          03840000
                BNO     LOGCLOSE            NO-                                  03850000
                SPACE 1                                                          03860000
                CLOSE   ((R12))             CLOSE IT                             03870000
                SPACE 1                                                          03880000
                LR      R1,R12              COPY DCB ADDRESS                     03890000
                SPACE 1                                                          03900000
                FREEPOOL (1)                FREE QSAM BUFFERS                    03910000
LOGCLOSE        DS      0H                                                       03920000
                LA      R1,DSUNALOC         POINT TO TEXT UNIT LIST              03930000
                ST      R1,DYNRB+S99TXTPP-S99RB STORE ADDRESS IN REQUEST BLK     03940000
                MVI     DYNRB+S99VERB-S99RB,S99VRBUN SET TO UNALLOCATE           03950000
                MVC     TXTDD+S99TUPAR-S99TUNIT(8),=CL8'USERFILE'                03960000
                BAL     R9,DYNA             GO UNALLOC                           03970000
                B       *+4                 ERROR ON UNALLOCATION                03980000
                MVC     TXTDD+S99TUPAR-S99TUNIT(8),=CL8'INPUT'                   03990000
                BAL     R9,DYNA             GO UNALLOC                           04000000
                B       *+4                 ERROR ON UNALLOCATION                04010000
                MVC     TXTDD+S99TUPAR-S99TUNIT(8),=CL8'SGMTFILE'                04020000
                BAL     R9,DYNA             GO UNALLOC                           04030000
                B       *+4                 ERROR ON UNALLOCATION                04040000
                SPACE 1                                                          04050000
                MVC     TXTDD+S99TUPAR-S99TUNIT(8),=CL8'LOG'                     04060000
                BAL     R9,DYNA             GO UNALLOC                           04070000
                B       *+4                 ERROR ON UNALLOCATION                04080000
                SPACE 1                                                          04090000
                L       R15,ISPLADDR        LOAD ADDRESS OF ISPLINK ROUTINE      04100000
                CALL    (15),(TBTOP,VARTABLE),VL DISPLAY                         04110000
                SPACE 1                                                          04120000
                L       R15,ISPLADDR        LOAD ADDRESS OF ISPLINK ROUTINE      04130000
                CALL    (15),(TBDISPL,VARTABLE,PRIMARY),VL DISPLAY               04140000
                SPACE 1                                                          04150000
                CH      R15,=H'8'           END/RETURN ENTERED?                  04160000
                BE      CONFIG              YES-                                 04170000
                SPACE 2                                                          04180000
*---------------------------------------------------------------*                04190000
*               DELETE AND RECREATE TABLE OF ERRORS             *                04200000
*---------------------------------------------------------------*                04210000
                SPACE 2                                                          04220000
                L       R15,ISPLADDR        LOAD ADDRESS OF ISPLINK ROUTINE      04230000
                CALL    (15),(TBCLOSE,VARTABLE),VL                               04240000
                SPACE 1                                                          04250000
                L       R15,ISPLADDR        LOAD ADDRESS OF ISPLINK ROUTINE      04260000
                CALL    (15),(TBCREATE,VARTABLE,,VARLIST,NOWRITE),VL             04270000
                SPACE 1                                                          04280000
                LTR     R15,R15             ERROR?                               04290000
                BNZ     ERROR01             YES-                                 04300000
                SPACE 2                                                          04310000
*---------------------------------------------------------------*                04320000
*               ALLOCATE INPUT FILE SPECIFIED BY USER           *                04330000
*---------------------------------------------------------------*                04340000
                SPACE 2                                                          04350000
                LA      R1,DSALLOCS         POINT TO TEXT UNIT LIST              04360000
                ST      R1,DYNRB+S99TXTPP-S99RB STORE ADDRESS IN REQUEST BLK     04370000
                MVI     DYNRB+S99VERB-S99RB,S99VRBAL SET TO ALLOCATE             04380000
```

```
         MVC    TXTDD+S99TUPAR-S99TUNIT(8),=CL8'USERFILE' SET DDNAME     04390000
         MVC    TXTDSN+S99TUPAR-S99TUNIT(44),DSN   COPY DS NAME          04400000
         BAL    R9,DYNA              GO ALLOC FILE                       04410000
         B      ERROR02              ERROR ON ALLOCATION                 04420000
         SPACE  1                                                        04430000
         LA     R1,DSALLOC0          POINT TO TEXT UNIT LIST             04440000
         ST     R1,DYNRB+S99TXTPP-S99RB STORE ADDRESS IN REQUEST BLK     04450000
         MVI    DYNRB+S99VERB-S99RB,S99VRBAL SET TO ALLOCATE             04460000
         MVC    TXTDD+S99TUPAR-S99TUNIT(8),=CL8'LOG' SET DDNAME          04470000
         MVC    TXTDSN+S99TUPAR-S99TUNIT(44),DSNL  COPY DS NAME          04480000
         BAL    R9,DYNA              GO ALLOC FILE                       04490000
         B      ERROR02              ERROR ON ALLOCATION                 04500000
         LA     R1,DSALLOC0          POINT TO TEXT UNIT LIST             04510000
         ST     R1,DYNRB+S99TXTPP-S99RB STORE ADDRESS IN REQUEST BLK     04520000
         MVI    DYNRB+S99VERB-S99RB,S99VRBAL SET TO ALLOCATE             04530000
         MVC    TXTDD+S99TUPAR-S99TUNIT(8),=CL8'INPUT' SET DDNAME        04540000
         MVC    TXTDSN+S99TUPAR-S99TUNIT(44),DSNW  COPY DS NAME          04550000
         BAL    R9,DYNA              GO ALLOC FILE                       04560000
         B      ERROR02              ERROR ON ALLOCATION                 04570000
         LA     R12,INPDCB           POINT TO DCB                        04580000
         MVC    DDERR,DCBDDNAM       SET DDNAME IN ERROR MSG             04590000
         SPACE  1                                                        04600000
         OPEN   ((R12),(INPUT))      OPEN FILE                           04610000
         SPACE  1                                                        04620000
         TM     DCBOFLGS,DCBOFOPN    WAS OPEN SUCCESSFUL?                04630000
         BNO    ERROR06              NO-                                 04640000
         TM     DCBRECFM,DCBRECF+DCBRECBR FB RECORDS?                    04650000
         BNO    ERROR10              ERROR                               04660000
         LH     R0,DCBLRECL          GET LRECL                           04670000
         CH     R0,=H'80'            LRECL = 80?                         04680000
         BNE    ERROR10              NO ERROR                            04690000
         SPACE  1                                                        04700000
         CLOSE  ((R12))              CLOSE FILE                          04710000
         SPACE  1                                                        04720000
         MVI    DYNRB+S99VERB-S99RB,S99VRBAL SET TO ALLOCATE             04730000
         MVC    TXTDD+S99TUPAR-S99TUNIT(8),=CL8'SGMTFILE' SET DDNAME     04740000
         MVC    TXTDSN+S99TUPAR-S99TUNIT(44),DSNS  COPY DS NAME          04750000
         BAL    R9,DYNA              GO ALLOC FILE                       04760000
         B      ERROR02              ERROR ON ALLOCATION                 04770000
         LA     R12,OUTDCBX          POINT TO DCB                        04780000
         MVC    DDERR,DCBDDNAM       SET DDNAME IN ERROR MSG             04790000
         SPACE  1                                                        04800000
         OPEN   ((R12),(INPUT))      OPEN FILE                           04810000
         SPACE  1                                                        04820000
         TM     DCBOFLGS,DCBOFOPN    WAS OPEN SUCCESSFUL?                04830000
         BNO    ERROR06              NO-                                 04840000
         TM     DCBRECFM,DCBRECV+DCBRECBR VB RECORDS?                    04850000
         BNO    ERROR11              NO- ERROR                           04860000
         LH     R0,DCBLRECL          GET LRECL                           04870000
         CH     R0,=H'259'           LRECL = 259?                        04880000
         BNE    ERROR11              NO ERROR                            04890000
         SPACE  1                                                        04900000
         CLOSE  ((R12))              CLOSE FILE                          04910000
         SPACE  1                                                        04920000
         MVC    IDCB,=CL8'USERFILE'  SET INPUT DDNAME FOR REBLOCK        04930000
         MVC    ODCB,=CL8'INPUT'     SET OUTPUT DDNAME FOR REBLOCK       04940000
         LA     R12,LOGDCB           POINT TO STORE DCB                  04950000
         MVC    DDERR,DCBDDNAM       SET DDNAME IN ERROR MSG             04960000
         SPACE  1                                                        04970000
         OPEN   ((R12),(OUTPUT))     OPEN FILE                           04980000
         SPACE  1                                                        04990000
         TM     DCBOFLGS,DCBOFOPN    WAS OPEN SUCCESSFUL?                05000000
         BNO    ERROR06              NO-                                 05010000
TRANLOOP DS     0H                                                       05020000
         SPACE  1                                                        05030000
         CALL   REBLK,(DCBNAMES),VL GO REBLOCK FILE FOR XLATOR           05040000
         SPACE  1                                                        05050000
         LTR    R15,R15              REBLOCK OK?                         05060000
         BNZ    ERROR04              NO-                                 05070000
         SPACE  1                                                        05080000
         L      R15,ISPLADDR         LOAD ADDRESS OF ISPLINK ROUTINE     05090000
         SPACE  1                                                        05100000
         CALL   (15),(SELECT,LENGTH11,SELCMD),VL                         05110000
         SPACE  1                                                        05120000
         LTR    R15,R15              BYPASS CHECK                        05130000
         BNZ    BYPASST              YES-                                05140000
         SPACE  1                                                        05150000
*-----------------------------------------------------------------*     05160000
*        GET INFORMATION ABOUT PROBLEM                            *     05170000
*-----------------------------------------------------------------*     05180000
         SPACE  1                                                        05190000
CHECKERR DS     0H                                                       05200000
         LA     R12,ERRDCB           POINT TO ERROR DCB                  05210000
         MVC    DDERR,DCBDDNAM       SET DDNAME IN ERROR MSG             05220000
         LA     R0,BYPASST           SET EOD ADDRESS                     05230000
         STCM   R0,B'0111',DCBEODA   IN DCB                              05240000
         SPACE  1                                                        05250000
         OPEN   ((R12),(INPUT))      OPEN FILE                           05260000
         SPACE  1                                                        05270000
         TM     DCBOFLGS,DCBOFOPN    WAS OPEN SUCCESSFUL?                05280000
         BNO    ERROR06              NO-                                 05290000
         L      R0,BUFFER            GET BUFFER ADDRESS                  05300000
```

```
         SPACE 1                                              05310000
         GET   ERRDCB            RETRIEVE ERROR RECORD        05320000
         SPACE 1                                              05330000
         CLOSE ((R12))           CLOSE FILE                   05340000
         SPACE 1                                              05350000
         LR    R1,R12            COPY DCB ADDRESS             05360000
         SPACE 1                                              05370000
         FREEPOOL (1)            FREE QSAM BUFFERS            05380000
         SPACE 1                                              05390000
         L     R6,BUFFER         GET ERROR BUFFER ADDRESS     05400000
         AH    R6,=H'4'          POINT PAST RDW               05410000
         USING TRANREC,R6        GET ADDRESSABILITY           05420000
         MVC   STD,TRANSTND      SET STANDARD                 05430000
         MVC   RLS,TRANRLSE      SET RELEASE                  05440000
         MVC   VERS,TRANVERS     SET VERSION                  05450000
         MVC   AGCY,TRANAGCY     SET AGENCY                   05460000
         MVC   REAS,TRANREAS     SET REASON                   05470000
         MVC   LASTSEG,TRANLAST  SET LAST SEGMENT PROCESSED   05480000
         PACK  DBLWORD,TRANLAST  PACK LAST SEGMENT FIELD      05490000
         AP    DBLWORD,=P'1'     ADD ONE TO GET PROBLEM SGMT  05500000
         UNPK  NUMB,DBLWORD      GET IT BACK TO EBCDIC        05510000
         OI    NUMB+5,X'F0'      SET ZONE                     05520000
         MVC   SEP,TRANSDLM      SET SEGMENT DELIMETER        05530000
         SPACE 1                                              05540000
*-------------------------------------------------------------* 05550000
*        UPDATE LOG                                           * 05560000
*-------------------------------------------------------------* 05570000
         SPACE 1                                              05580000
         L     R2,BUFFER         GET BUFFER ADDRESS           05590000
         MVC   0(80,R2),=CL80' ' BLANK OUT BUFFER             05600000
         MVC   0(L'REAS,R2),REAS COPY INTO BUFFER             05610000
         SPACE 1                                              05620000
         PUT   LOGDCB,(R2)       WRITE RECORD                 05630000
         SPACE 1                                              05640000
*-------------------------------------------------------------* 05650000
*        ADD REASON TO TABLE                                  * 05660000
*-------------------------------------------------------------* 05670000
         SPACE 1                                              05680000
         L     R15,ISPLADDR      LOAD ADDRESS OF ISPLINK ROUTINE 05690000
         CALL  (15),(TBADD,VARTABLE),VL                       05700000
         SPACE 1                                              05710000
         LTR   R15,R15           ERROR?                       05720000
         BNZ   ERROR07           YES-                         05730000
         SPACE 1                                              05740000
*-------------------------------------------------------------* 05750000
*        BUILD STORE FILE                                     * 05760000
*-------------------------------------------------------------* 05770000
         SPACE 1                                              05780000
         LA    R12,STOREDCB      POINT TO STORE DCB           05790000
         MVC   DDERR,DCBDDNAM    SET DDNAME IN ERROR MSG      05800000
         SPACE 1                                              05810000
         OPEN  ((R12),(OUTPUT))  OPEN FILE                    05820000
         SPACE 1                                              05830000
         TM    DCBOFLGS,DCBOFOPN WAS OPEN SUCCESSFUL?         05840000
         BNO   ERROR06           NO-                          05850000
         L     R2,BUFFER         GET BUFFER ADDRESS           05860000
         MVC   0(80,R2),=CL80' ' BLANK OUT BUFFER             05870000
         LA    R6,TRANSTOR       POINT TO TAG                 05880000
         USING TRANSTOR,R6       GET ADDRESSABILITY           05890000
STORCONT DS    0H                                             05900000
         CLC   TRANTAG(L'BEDZERO),BEDZERO END OF VALUES?      05910000
         BE    STORQUIT          YES-                         05920000
         MVC   0(L'TRANSTOR,R2),TRANSTOR COPY INTO BUFFER     05930000
         SPACE 1                                              05940000
         PUT   STOREDCB,(R2)     WRITE RECORD                 05950000
         SPACE 1                                              05960000
         LA    R6,L'TRANSTOR(R6) INCREMENT POINTER            05970000
         B     STORCONT          CONTINUE                     05980000
STORQUIT DS    0H                                             05990000
         CLOSE ((R12))           CLOSE IT                     06000000
         SPACE 1                                              06010000
         LR    R1,R12            COPY DCB ADDRESS             06020000
         SPACE 1                                              06030000
         FREEPOOL (1)            FREE QSAM BUFFERS            06040000
         SPACE 1                                              06050000
*-------------------------------------------------------------* 06060000
*        OPEN INPUT FILE                                      * 06070000
*-------------------------------------------------------------* 06080000
         SPACE 1                                              06090000
         LA    R12,INPDCB        POINT TO INPUT DCB           06100000
         MVC   DDERR,DCBDDNAM    SET DDNAME IN ERROR MSG      06110000
         SPACE 1                                              06120000
         OPEN  ((R12),(INPUT))   OPEN FILE                    06130000
         SPACE 1                                              06140000
         TM    DCBOFLGS,DCBOFOPN WAS OPEN SUCCESSFUL?         06150000
         BNO   ERROR06           NO-                          06160000
         SPACE 1                                              06170000
*-------------------------------------------------------------* 06180000
*        OPEN TEMPORARY FILE FOR OUTPUT                       * 06190000
*-------------------------------------------------------------* 06200000
```

```
          SPACE 1                                              06210000
          LA    R12,OUTDCB        POINT TO OUTPUT DCB          06220000
          MVC   DDERR,DCBDDNAM    SET DDNAME IN ERROR MSG      06230000
          SPACE 1                                              06240000
          OPEN  ((R12),(OUTPUT))  OPEN FILE                    06250000
          SPACE 1                                              06260000
          TM    DCBOFLGS,DCBOFOPN WAS OPEN SUCCESSFUL?         06270000
          BNO   ERROR06           NO-                          06280000
          NI    BEDFLAG1,FF-INEOF-PERMIERR RESET FLAGS         06290000
NEXTSGMT  DS    0H                                             06300000
          BAL   R9,FINDSGMT       YES- GO FIND SEGMENT         06310000
          B     ERROR08           ERROR-                       06320000
          B     CLOSEOUT          EOF-                         06330000
          L     R0,BUFFRDW        POINT TO SEGMENT             06340000
          SPACE 1                                              06350000
          PUT   OUTDCB            WRITE IT                     06360000
          SPACE 1                                              06370000
          B     NEXTSGMT          NORMAL                       06380000
CLOSEOUT  DS    0H                                             06390000
          LA    R12,OUTDCB        POINT TO OUTPUT DCB          06400000
          SPACE 1                                              06410000
          CLOSE ((R12))           CLOSE IT                     06420000
          SPACE 1                                              06430000
          LR    R1,R12            COPY DCB ADDRESS             06440000
          SPACE 1                                              06450000
          FREEPOOL (1)            FREE QSAM BUFFERS            06460000
          SPACE 1                                              06470000
*---------------------------------------------------------* 06480000
*         BRING UP EDIT FACILITY FOR INPUT FILE           * 06490000
*---------------------------------------------------------* 06500000
          SPACE 1                                              06510000
EDITSGMT  DS    0H                                             06520000
          MVC   TDSN,DSNS         SET SEGMENT FILE NAME?       06530000
          LA    R1,TDSN           POINT TO DSN                 06540000
          B     *+8                                            06550000
IDSNLOOP  DS    0H                                             06560000
          LA    R1,1(R1)          POINT TO NEXT BYTE           06570000
          CLI   0(R1),C' '        IS THIS A BLANK DELIMETER    06580000
          BNE   IDSNLOOP          NO- CONTINUE                 06590000
          MVI   0(R1),C'*'        MOVE IN ASTERISK             06600000
SKIPTDLM  DS    0H                                             06610000
          L     R15,ISPLADDR      LOAD ADDRESS OF ISPLINK ROUTINE 06620000
          CALL  (15),(EDIT,TEMPDSN,,,PANEL2),VL                06630000
          SPACE 1                                              06640000
          CH    R15,=H'4'         ABNORMAL RETURN?             06650000
          BH    ERROR09           YES-                         06660000
          BE    BYPASSX           NORMAL RETURN(NOSAVE)        06670000
          MVC   IDCB,=CL8'SGMTFILE' SET INPUT DDNAME FOR REBLOCK 06680000
          B     TRANLOOP          GO TRANSLATE AGAIN           06690000
BYPASST   DS    0H                                             06700000
          SPACE 1                                              06710000
          CLOSE ((R12))           CLOSE FILE                   06720000
          SPACE 1                                              06730000
          LR    R1,R12            COPY DCB ADDRESS             06740000
          SPACE 1                                              06750000
          FREEPOOL (1)            FREE QSAM BUFFERS            06760000
          SPACE 1                                              06770000
          MVC   MSGID,=CL8'EDIL050' SET MSGID                  06780000
          BAL   R9,SETMSGX        DISPLAY MSG                  06790000
          B     DISPPRIM          DISPLAY RESULTS              06800000
BYPASSX   DS    0H                                             06810000
          MVC   MSGID,=CL8'EDIL063' SET MSGID                  06820000
          BAL   R9,SETMSGX        DISPLAY MSG                  06830000
          B     DISPPRIM          DISPLAY RESULTS              06840000
          SPACE 1                                              06850000
*---------------------------------------------------------* 06860000
*         UNALLOCATE ALL FILES USED                       * 06870000
*---------------------------------------------------------* 06880000
          SPACE 1                                              06890000
ENDSESS   DS    0H                                             06900000
          ESTAE 0                 CANCEL ESTAE                 06910000
          SPACE 1                                              06920000
          LA    R1,DSUNALOC       POINT TO TEXT UNIT LIST      06930000
          ST    R1,DYNRB+S99TXTPP-S99RB STORE ADDRESS IN REQUEST BLK 06940000
          MVI   DYNRB+S99VERB-S99RB,S99VRBUN SET TO UNALLOCATE 06950000
          LA    R2,SOLIST         POINT TO SYSOUT LIST         06960000
UNALSYSO  DS    0H                                             06970000
          CLI   0(R2),C' '        END OF LIST?                 06980000
          BE    UNALDSO           YES-                         06990000
          MVC   TXTDD+S99TUPAR-S99TUNIT(8),0(R2) COPY DDNAME   07000000
          BAL   R9,DYNA           GO UNALLOC                   07010000
          B     *+4               ERROR ON UNALLOCATION        07020000
          LA    R2,8(R2)          POINT TO NEXT DDNAME         07030000
          B     UNALSYSO          CONTINUE                     07040000
UNALDSO   DS    0H                                             07050000
          LA    R2,DSLISTO        POINT TO DS LIST             07060000
UNALDSXO  DS    0H                                             07070000
          CLI   0(R2),C' '        END OF LIST?                 07080000
          BE    UNALDSS           YES-                         07090000
          MVC   TXTDD+S99TUPAR-S99TUNIT(8),0(R2) COPY DDNAME   07100000
          BAL   R9,DYNA           GO UNALLOCATE FILE           07110000
```

```
                B       *+4                     ERROR ON UNALLOCATION              07120000
                LA      R2,L'DCBXNEW(R2)        POINT TO NEXT DDNAME               07130000
                B       UNALDSXG                CONTINUE                           07140000
                SPACE   1                                                          07150000
UNALDSS         DS      0H                                                         07160000
                LA      R2,DSLISTS              POINT TO DS LIST                   07170000
UNALDSXS        DS      0H                                                         07180000
                CLI     0(R2),C' '              END OF LIST?                       07190000
                BE      CLOSTABL                YES-                               07200000
                MVC     TXTDD+S99TUPAR-S99TUNIT(8),0(R2) COPY DDNAME                07210000
                BAL     R9,DYNA                 GO UNALLOCATE FILE                 07220000
                B       *+4                     ERROR ON UNALLOCATION              07230000
                LA      R2,L'DCBXNEW(R2)        POINT TO NEXT DDNAME               07240000
                B       UNALDSXS                CONTINUE                           07250000
                SPACE   1                                                          07260000
CLOSTABL        DS      0H                                                         07270000
                L       R15,ISPLADDR            LOAD ADDRESS OF ISPLINK ROUTINE    07280000
                CALL    (15),(TBCLOSE,VARTABLE),VL                                 07290000
                SPACE   1                                                          07300000
                L       R15,ISPLADDR            LOAD ADDRESS OF ISPLINK ROUTINE    07310000
                CALL    (15),(VPUT,SAVLIST,PROFILE),VL                             07320000
                SPACE   1                                                          07330000
*---------------------------------------------------------------------* 07340000
*               RESTORE REGISTERS AND RETURN TO CALLER                * 07350000
*---------------------------------------------------------------------* 07360000
                SPACE   1                                                          07370000
RETURNX         DS      0H                                                         07380000
                L       R13,4(,R13)                                                07390000
                L       R14,12(,R13)            RESTORE CALLERS SAVE AREA
                                                RETURN ADDRESS                     07400000
                LM      R0,R12,20(R13)          REGISTERS                          07410000
                BR      R14                                                        07420000
                SPACE   1                                                          07430000
*---------------------------------------------------------------------* 07440000
*       THIS SUBROUTINE WILL UN/ALLOCATE THE FILES NEEDED.            * 07450000
*       RETURN TO THE CALLER WITH A DISPLACEMENT DEPENDING ON         * 07460000
*       THE RETURN CODE IN R15.                                       * 07470000
*                                                                     * 07480000
*       ON ENTRY: R9 => RETURN ADDRESS                                * 07490000
*                                                                     * 07500000
*       RETURNS : 0(R9) => ERROR RETURN                               * 07510000
*                 4(R9) => NORMAL RETURN                              * 07520000
*                                                                     * 07530000
*---------------------------------------------------------------------* 07540000
                SPACE   1                                                          07550000
DYNA            DS      0H                                                         07560000
                LA      R1,DYNRBP               SET UP REQUEST BLOCK CHAIN         07570000
                SPACE   1                                                          07580000
                DYNALLOC ,                      GO ALLOCATE IT                     07590000
                SPACE   1                                                          07600000
                LTR     R15,R15                 ALLOCATION SUCCESSFUL?             07610000
                BNZ     0(R9)                   NO- TAKE EXIT RETURN               07620000
                B       4(R9)                   TAKE NORMAL RETURN                 07630000
                SPACE   1                                                          07640000
*---------------------------------------------------------------------* 07650000
*               LOG MESSAGES                                          * 07660000
*---------------------------------------------------------------------* 07670000
                SPACE   1                                                          07680000
LOGIT           DS      0H                                                         07690000
                L       R15,ISPLADDR            LOAD ADDRESS OF ISPLINK ROUTINE    07700000
                CALL    (15),(LOG,MSGID),VL LOG IT                                 07710000
                SPACE   1                                                          07720000
                BR      R9                      RETURN                             07730000
                SPACE   1                                                          07740000
*---------------------------------------------------------------------* 07750000
*               SET MESSAGES                                          * 07760000
*---------------------------------------------------------------------* 07770000
                SPACE   1                                                          07780000
SETMSGX         DS      0H                                                         07790000
                L       R15,ISPLADDR            LOAD ADDRESS OF ISPLINK ROUTINE    07800000
                CALL    (15),(SETMSG,MSGID),VL LOG IT                              07810000
                SPACE   1                                                          07820000
                BR      R9                      RETURN                             07830000
                SPACE   1                                                          07840000
*---------------------------------------------------------------------* 07850000
*               ERROR ROUTINES                                        * 07860000
*---------------------------------------------------------------------* 07870000
                SPACE   1                                                          07880000
ERROR01         DS      0H                      TABLE CREATE ERROR                 07890000
                ST      R15,RTNCODE             SAVE RETURN CODE                   07900000
                MVC     MSGID,=CL8'EDIL051'     SET MSG ID FAILURE                 07910000
                B       ERROR                                                      07920000
                SPACE   1                                                          07930000
ERROR02         DS      0H                      ALLOCATION FAILURE                 07940000
                ST      R15,RTNCODE             SAVE RETURN CODE                   07950000
                MVC     REEZCODE,DYNRB+S99ERROR-S99RB SET REASON CODE              07960000
                MVC     DDERR,TXTDD+S99TUPAR-S99TUNIT SET DDNAME IN MSG            07970000
                MVC     MSGID,=CL8'EDIL052'     SET MSG ID FAILURE                 07980000
                B       ERROR                                                      07990000
                SPACE   1                                                          08000000
ERROR03         DS      0H                      ALLOCATION FAILURE                 08010000
                ST      R15,RTNCODE             SAVE RETURN CODE                   08020000
```

```
         MVC   REEZCODE,DYNRB+S99ERROR-S99RB SET REASON CODE         08030000
         MVC   DDERR,TXTDD+S99TUPAR-S99TUNIT SET DDNAME IN MSG       08040000
         MVC   MSGID,=CL8'EDIL053' SET MSG ID FAILURE                08050000
         B     ERROR                                                 08060000
         SPACE 1                                                     08070000
ERROR04  DS    0H                   REBLOCK ERROR                    08080000
         ST    R15,RTNCODE          SAVE RETURN CODE                 08090000
         MVC   MSGID,=CL8'EDIL054'  SET MSG ID FAILURE               08100000
         B     ERROR                                                 08110000
         SPACE 1                                                     08120000
ERROR05  DS    0H                   ATTACH FAILURE                   08130000
         ST    R15,RTNCODE          SAVE RETURN CODE                 08140000
         MVC   MSGID,=CL8'EDIL055'  SET MSG ID FAILURE               08150000
         B     ERROR                                                 08160000
         SPACE 1                                                     08170000
ERROR06  DS    0H                   OPEN FAILURE                     08180000
         MVC   MSGID,=CL8'EDIL056'  SET MSG ID FAILURE               08190000
         B     ERROR                                                 08200000
         SPACE 1                                                     08210000
ERROR07  DS    0H                   TBADD FAILURE                    08220000
         ST    R15,RTNCODE          SAVE RETURN CODE                 08230000
         MVC   MSGID,=CL8'EDIL057'  SET MSG ID FAILURE               08240000
         B     ERROR                                                 08250000
         SPACE 1                                                     08260000
ERROR08  DS    0H                   PARSE SEGMENT                    08270000
         LA    R12,INPDCB           POINT TO INPUTDCB                08280000
         SPACE 1                                                     08290000
         CLOSE ((R12))              CLOSE IT                         08300000
         SPACE 1                                                     08310000
         LR    R1,R12               COPY DCB ADDRESS                 08320000
         SPACE 1                                                     08330000
         FREEPOOL (1)               FREE QSAM BUFFERS                08340000
         SPACE 1                                                     08350000
         LA    R12,OUTDCB           POINT TO OUTPUT DCB              08360000
         SPACE 1                                                     08370000
         CLOSE ((R12))              CLOSE IT                         08380000
         SPACE 1                                                     08390000
         LR    R1,R12               COPY DCB ADDRESS                 08400000
         SPACE 1                                                     08410000
         FREEPOOL (1)               FREE QSAM BUFFERS                08420000
         SPACE 1                                                     08430000
         MVC   MSGID,=CL8'EDIL058'  SET MSG ID FAILURE               08440000
         B     ERROR                                                 08450000
         SPACE 1                                                     08460000
ERROR09  DS    0H                   EDIT ERROR                       08470000
         ST    R15,RTNCODE          SAVE RETURN CODE                 08480000
         MVC   MSGID,=CL8'EDIL059'  SET MSG ID FAILURE               08490000
         B     ERROR                                                 08500000
         SPACE 1                                                     08510000
ERROR10  DS    0H                   WORK FILE FORMAT ERROR           08520000
         CLOSE ((R12))              CLOSE FILE                       08530000
         SPACE 1                                                     08540000
         MVC   MSGID,=CL8'EDIL060'  SET MSG ID FAILURE               08550000
         B     ERROR                                                 08560000
         SPACE 1                                                     08570000
ERROR11  DS    0H                   SEGMENT FILE FORMAT ERROR        08580000
         SPACE 1                                                     08590000
         CLOSE ((R12))              CLOSE FILE                       08600000
         SPACE 1                                                     08610000
         MVC   MSGID,=CL8'EDIL061'  SET MSG ID FAILURE               08620000
         B     ERROR                                                 08630000
         SPACE 1                                                     08640000
ERROR12  DS    0H                   SYSTEM ABEND                     08650000
         MVC   MSGID,=CL8'EDIL062'  SET MSG ID FAILURE               08660000
         B     ERROR                                                 08670000
         SPACE 1                                                     08680000
ERROR    DS    0H                   EDIT ERROR                       08690000
         BAL   R9,LOGIT             GO LOG IT                        08700000
         BAL   R9,SETMSGX           GO DISPLAY MSG                   08710000
         TM    FLAG1,INIT           ARE WE INITIALIZING?             08720000
         BO    ENDSESS              YES- END SESSION                 08730000
         B     DISPPRIM             NO- DISPLAY PANEL                08740000
         SPACE 1                                                     08750000
*-------------------------------------------------------------------* 08760000
*                                                                   * 08770000
*        THE FOLLOWING ROUTINE RETRIEVES THE NEXT LOGICAL RECORD    * 08780000
*        FROM A DASD DATASET.                                       * 08790000
*                                                                   * 08800000
*        INPUTS:                                                    * 08810000
*                                                                   * 08820000
*        R5 -  RETURN ADDRESS                                       * 08830000
*                                                                   * 08840000
*        OUTPUTS:                                                   * 08850000
*                                                                   * 08860000
*        R0 -  INPUT RECORD LENGTH                                  * 08870000
*        R1 -  INPUT RECORD ADDRESS                                 * 08880000
*                                                                   * 08890000
*-------------------------------------------------------------------* 08900000
         SPACE 2                                                     08910000
READFILE DS    0H                   ENTRY POINT IDENTIFIER           08920000
         STM   R14,R1,SAVEREGS      SAVE REGISTERS                   08930000
         LA    R12,INPDCB                                            08940000
```

```
          TM    BEDFLAG1,INEOF+PERMIERR  EOF PREVIOUSLY REACHED?       08950000
          BC    NALLOFF,READEOF          YES-                          08960000
          LA    R0,READEOF               POINT TO EOF EXIT ROUTINE     08970000
          STCM  R0,B'0111',DCBEODA       SAVE EODAD ADDR               08980000
          LA    R0,READSYN               POINT TO SYNAD EXIT ROUTINE   08990000
          STCM  R0,B'0111',DCBSYNA       SAVE SYNAD ADDRESS            09000000
          SPACE 1                                                      09010000
          GET   INPDCB                   RETRIEVE NEXT RECORD          09020000
          SPACE 1                                                      09030000
          TM    DCBRECFM,DCBRECU         RECFM U?                      09040000
          BC    ALLON,RECU               YES-                          09050000
          TM    DCBRECFM,DCBRECV         RECFM V?                      09060000
          BC    ALLON,RECV               YES-                          09070000
          SPACE 1                                                      09080000
*         UNDEFINED OR FIXED LENGTH RECORD FORMAT                      09090000
          SPACE 1                                                      09100000
RECU      DS    0H                                                     09110000
          LH    R0,DCBLRECL              LOAD RECORD LENGTH READ       09120000
          LTR   R0,R0                    UNBLOCKED RECORDS?            09130000
          BC    NZERO,READF200           NO-                           09140000
          LH    R0,DCBBLKSI              RETRIEVE BLOCKSIZE            09150000
          B     READF200                 RETURN                        09160000
          SPACE 1                                                      09170000
*         VARIABLE LENGTH RECORD FORMAT                                09180000
          SPACE 1                                                      09190000
RECV      DS    0H                                                     09200000
          LH    R0,0(,R1)                RETRIEVE VARIABLE RECORD LENGTH 09210000
          LA    R1,4(,R1)                POINT TO DATA PORTION OF RECORD 09220000
          S     R0,=F'4'                 ADJUST LENGTH FOR RDW         09230000
          B     READF200                 RETURN                        09240000
READEOF   DS    0H                                                     09250000
          SLR   R0,R0                    CLEAR READ LENGTH             09260000
          OI    BEDFLAG1,INEOF           SET EOF ENCOUNTERED           09270000
READCLS   DS    0H                                                     09280000
          TM    DCBOFLGS,DCBOFOPN        IS DATA SET OPEN?             09290000
          BC    ALLOFF,READF200          NO-                           09300000
          SPACE 1                                                      09310000
          CLOSE ((R12))                  CLOSE IT                      09320000
          SPACE 1                                                      09330000
          LR    R1,R12                   COPY DCB ADDRESS              09340000
          SPACE 1                                                      09350000
          FREEPOOL (1)                   FREE QSAM BUFFERS             09360000
          SPACE 1                                                      09370000
          SLR   R0,R0                    SET LENGTH                    09380000
          B     READF300                                               09390000
READSYN   DS    0H                                                     09400000
          SYNADAF ACSMETH=QSAM           REQUEST FORMATTED MESSAGE     09410000
          SPACE 1                                                      09420000
*         MVC   SYNADTXT,50(R1)          COPY MESSAGE TEXT             09430000
          SPACE 1                                                      09440000
*         COMMSGS TEXT=MSG230            NOTIFY OPERATOR               09450000
          SPACE 1                                                      09460000
          SYNADRLS                       RELEASE BUFFERS               09470000
          SPACE 1                                                      09480000
          OI    BEDFLAG1,PERMIERR        SET PERMANENT INPUT ERROR     09490000
          B     READCLS                  GO CLOSE IF NECESSARY         09500000
          SPACE 1                                                      09510000
*---------------------------------------------------------------*      09520000
*         NORMAL RETURN                                         *      09530000
*---------------------------------------------------------------*      09540000
          SPACE 1                                                      09550000
READF200  DS    0H                                                     09560000
          ST    R1,MOVESTAT+8            SAVE FOR SEGMENT ROUTINE      09570000
          ST    R0,MOVESTAT+12           SAVE    "                     09580000
READF300  DS    0H                                                     09590000
          LM    R14,R1,SAVEREGS          RESTORE REGISTERS             09600000
          BR    R5                                                     09610000
          SPACE 2                                                      09620000
*---------------------------------------------------------------*      09630000
*         FIND SEGMENT ROUTINE                                  *      09640000
*                                                               *      09650000
*         SUBROUTINE TO PROCESS THE HEADER RECORD AND PICK      *      09660000
*         OUT THE DATA ELEMENT AND SEGMENT SEPERATORS TO        *      09670000
*         DYNAMICALLY MAKE TO TRANSLATE TABLES.                 *      09680000
*                                                               *      09690000
*         INPUT - R9 - RETURN ADDRESS                           *      09700000
*           MOVESTAT+ 0 - ADDRESS OF SEGMENT BUILD AREA         *      09710000
*           MOVESTAT+ 4 - LENGTH OF SEGMENT BUILD AREA          *      09720000
*           MOVESTAT+ 8 - ADDRESS OF ANSI/UNJEDI RECORD         *      09730000
*           MOVESTAT+12 - LENGTH OF ANSI/UNJEDI RECORD          *      09740000
*                                                               *      09750000
*---------------------------------------------------------------*      09760000
          SPACE 3                                                      09770000
FINDSGMT  DS    0H                                                     09780000
          XC    MOVESTAT(8),MOVESTAT     RESET STATS OF BUILD AREA     09790000
          LM    R14,R15,MOVESTAT+8       GET WHERE LEFT OFF IN RECORD  09800000
          LTR   R15,R15                  ANY BYTES LEFT TO PROCESS?    09810000
          BNP   FNDHSTRT                 NO-                           09820000
          BCTR  R15,0                    YES- GET EXECUTABLE LENGTH    09830000
          LA    R5,TABLE01               GET TABLE ADDRESS             09840000
          EX    R15,ENDALPHA             FIND SEGMENT ID               09850000
```

```
                BZ      FNDS0080                NOT FOUND                               09860000
                LA      R15,1(R15,R14)          POINT PAST LAST BYTE OF RECORD          09870000
                LR      R14,R1                  COPY ADDRESS OF SEGMENT ID              09880000
                SR      R15,R14                 GET LENGTH LEFT                         09890000
FNDS0070        DS      0H                                                              09900000
                STM     R14,R15,MOVESTAT+8      RESET STATS                             09910000
                B       FNDHSTRT                CONTINUE                                09920000
FNDS0080        DS      0H                                                              09930000
                LA      R15,0                   SET ZERO BYTES LEFT OF THIS RECORD      09940000
                B       FNDS0070                CONTINUE                                09950000
FNDALPHA        TRT     0(0,R14),0(R5)                                                  09960000
FNDHSTRT        DS      0H                                                              09970000
                ICM     R0,B'1111',MOVESTAT+12  FINISHED READING RECORD?                09980000
                BNZ     FNDS0090                NO-                                     09990000
                SPACE   1                                                               10000000
                BAL     R5,READFILE             RETRIEVE NEXT INPUT RECORD              10010000
                TM      BEDFLAG1,INEOF          EOF REACHED?                            10020000
                BO      FNDH1300                YES-                                    10030000
                SPACE   1                                                               10040000
                LM      R14,R15,MOVESTAT+8      GET RECORD ADDRESS/LENGTH               10050000
FNDS0090        DS      0H                                                              10060000
                ICM     R0,B'1111',MOVESTAT+4   FINISHED BUILDING RECORD?               10070000
                BNZ     FNDS0100                NO-                                     10080000
                L       R1,BUFFER               NO- GET ADDRESS OF BUILD AREA           10090000
                ST      R1,MOVESTAT             SAVE IT                                 10100000
                LA      R1,L'ERRBUFF            GET LENGTH OF BUILD AREA                10110000
                ST      R1,MOVESTAT+4           SAVE IT                                 10120000
FNDS0100        DS      0H                                                              10130000
                CLC     SEP,0(R14)              NO- SEPARATOR?                          10140000
                BE      FNDH0900                YES-                                    10150000
FNDS0500        DS      0H                                                              10160000
                LA      R14,1(R14)              NO- POINT TO NEXT BYTE                  10170000
                BCT     R15,FNDS0100            PROCESS REST OF RECORD                  10180000
FNDS0600        DS      0H                                                              10190000
                S       R1,MOVESTAT+12          UPDATE DISPLACEMENT OF SEPARATOR        10200000
                STH     R1,ELMTCTR              SAVE IT                                 10210000
                LM      R14,R1,MOVESTAT         GET MOVE STATS                          10220000
                CR      R15,R1                  RECV LGTH > SEND LGTH?                  10230000
                BNH     FNDHERR                 NO- ERROR                               10240000
                LR      R15,R1                  SET RECV LGTH TO SEND LGTH              10250000
                MVCL    R14,R0                  MOVE TO RECORD BUILD AREA               10260000
                L       R15,MOVESTAT+4          GET MAX LGTH OF BUILD AREA              10270000
                S       R15,MOVESTAT+12         MINUS ACTUAL BYTES MOVE                 10280000
                STM     R14,R1,MOVESTAT         SAVE MOVE STAT                          10290000
                B       FNDHSTRT                GO READ ANOTHER RECORD                  10300000
FNDH0900        DS      0H                                                              10310000
                S       R14,MOVESTAT+8          CALC LGTH OF REST OF SEGMENT            10320000
                LA      R1,1(R14)               ADD ONE FOR SEGMENT                     10330000
                B       FNDH1000                GO MOVE TO BUILD AREA                   10340000
FNDH1000        DS      0H                                                              10350000
                LM      R14,R0,MOVESTAT         SET UP FOR MOVE                         10360000
                CR      R15,R1                  RECV LGTH > SEND LGTH?                  10370000
                BH      FNDH1100                YES-                                    10380000
                LR      R1,R15                  NO- SET SEND LGTH TO RECV LGTH          10390000
                B       FNDH1200                                                        10400000
FNDH1100        DS      0H                                                              10410000
                LR      R15,R1                  SET RECV LGTH TO SEND LGTH              10420000
FNDH1200        DS      0H                                                              10430000
                LTR     R15,R15                 LENGTH POSITIVE?                        10440000
                BNP     FNDH1400                NO-                                     10450000
                CH      R15,=H'256'             YES- TOO BIG?                           10460000
                BH      FNDH1400                YES-                                    10470000
                MVCL    R14,R0                  MOVE TO RECORD BUILD AREA               10480000
                LR      R15,R0                  GET ADDR PAST SEPERATOR                 10490000
                S       R15,MOVESTAT+8          CALC BYTES MOVED                        10500000
                L       R1,MOVESTAT+12          GET TOTAL BYTES IN RECORD               10510000
                SR      R1,R15                  CALC RESIDUAL BYTE COUNT                10520000
                STM     R0,R1,MOVESTAT+8        SAVE FOR LATER                          10530000
                L       R15,BUFFER              GET BEGINNING OF RECORD                 10540000
                SR      R14,R15                 CALC LENGTH OF RECORD                   10550000
                LA      R14,4(R14)              ADD LENGTH OF RDW                       10560000
                L       R15,BUFFRDW             GET ADDRESS OF RDW                      10570000
                STCM    R14,B'0011',0(R15)      SET RDW                                 10580000
                B       FNDHNORM                RETURN                                  10590000
FNDH1300        DS      0H                                                              10600000
                CLC     MOVESTAT+4(4),BEDZERO   STILL BUILDING A SEGMENT?               10610000
                BE      FNDHEOF                 NO-                                     10620000
                B       FNDHERR                 YES- END OF SEGMENT MISSING             10630000
FNDH1400        DS      0H                                                              10640000
                STM     R14,R1,MOVESTAT         SAVE REGISTERS                          10650000
                ABEND   8,DUMP                                                          10660000
                SPACE   1                                                               10670000
*---------------------------------------------------------------------*                 10680000
*       +0      ERROR RETURN                                          *                 10690000
*---------------------------------------------------------------------*                 10700000
                SPACE   1                                                               10710000
FNDHERR         DS      0H                                                              10720000
                B       0(R9)                                                           10730000
                SPACE   1                                                               10740000
*---------------------------------------------------------------------*                 10750000
*       +4      EOF RETURN                                            *                 10760000
*---------------------------------------------------------------------*                 10770000
                SPACE   1                                                               10780000
FNDHEOF         DS      0H                                                              10790000
                B       4(R9)                                                           10800000
```

```
                SPACE 1                                                             10810000
*--------------------------------------------------------------------*              10820000
*               +8      NORMAL RETURN                                *              10830000
*--------------------------------------------------------------------*              10840000
                SPACE 1                                                             10850000
FNDHNORM  DS    0H                                                                  10860000
          B     8(R9)                                                               10870000
          SPACE 1                                                                   10880000
TABLE01   SCNTBL CHARSET=ALPHA,FUNC=LOCATE                                          10890000
          SPACE 1                                                                   10900000
TBABEND   DS    0H                                                                  10910000
          PUSH  USING                                                               10920000
          DROP                                                                      10930000
          USING *,R15                                                               10940000
          CH    R0,=H'12'             SDWA PRESENT?                                 10950000
          BNE   AAABEND1              YES-                                          10960000
*               RETURN TO RTM, ATTEMPTING RECOVERY:                                 10970000
          SPACE 1                                                                   10980000
          LA    R0,AAABEND2           POINT TO REINSTATEMENT ROUTINE                10990000
          LA    R15,4                 INDICATE TASK IS TO BE REINSTATED             11000000
          BR    R14                   RETURN TO RTM                                 11010000
          SPACE 1                                                                   11020000
AAABEND1  DS    0H                                                                  11030000
          STM   R14,R12,12(R13)       SAVE REGS                                     11040000
          LR    R10,R15               SET BASE                                      11050000
          USING TBABEND,R10                                                         11060000
          DROP  R15                                                                 11070000
          LR    R4,R1                 SDWA ADR                                      11080000
          USING SDWA,R4                                                             11090000
          L     R2,SDWAPARM           GET BASE REGISTER                             11100000
          USING EDITSBED,R2           GET ADDRESSABILITY                            11110000
          LA    R3,2048(,R2)          SET 2ND BASE REG                              11120000
          LA    R3,2048(,R3)                                                        11130000
          USING EDITSBED+4096,R3                                                    11140000
          ICM   R1,B'0111',SDWACMPC   GET COMPLETION CODE                           11150000
          DROP  R4                                                                  11160000
          SRL   R1,12                                                               11170000
          N     R1,=X'00000FFF'                                                     11180000
          ST    R1,RTNCODE            SAVE IT                                       11190000
          SPACE 1                                                                   11200000
          SETRP REGS=(14,12),                                                      +11210000
                RC=4,RETADDR=AAABEND2,FRESDWA=YES,WKAREA=(4)                        11220000
          SPACE 1                                                                   11230000
          POP   USING                                                               11240000
          SPACE 2                                                                   11250000
AAABEND2  DS    0H                                                                  11260000
          LR    R10,R1                SET BASE REGISTER                             11270000
          LA    R11,2048(,R10)        SET 2ND BASE REG                              11280000
          LA    R11,2048(,R11)                                                      11290000
          L     R2,=A(ERROR12)        POINT TO RESTART ADDRESS                      11300000
          BR    R2                    GO TO IT                                      11310000
          SPACE 1                                                                   11320000
          LTORG                                                                     11330000
          EJECT                                                                     11340000
*--------------------------------------------------------------------*              11350000
*               MISC DATA AREA                                       *              11360000
*--------------------------------------------------------------------*              11370000
          SPACE 1                                                                   11380000
ZUSER     DC    CL8' '                                                              11390000
XLATOR    DC    A(0)                                                                11400000
SAVEAREA  DC    18F'0'                                                              11410000
SAVEREGS  DC    18F'0'                                                              11420000
DBLWORD   DC    D'0'                                                                11430000
BUFFRDW   DC    A(ERRRDW)             POINT TO RDW                                  11440000
BUFFER    DC    A(ERRBUFF)            POINTER TO ERROR BUFFER                       11450000
MSGID     DC    CL8' '                MESSAGE ID                                    11460000
DCBNAMES  DC    AL2(L'IDCB+L'ODCB+L'EDCB)  LENGTH OF DDNAMES                        11470000
IDCB      DC    CL8' '                INPUT DCB FOR REBLOCK                         11480000
ODCB      DC    CL8' '                OUTPUT DCB FOR REBLOCK                        11490000
EDCB      DC    CL8'REBLKERR'         SYSPRINT DCB FOR REBLOCK                      11500000
ISPLADDR  DC    A(0)                                                                11510000
TEMPDSN   DC    C' '                                                                11520000
IDSN      DC    CL44' '                                                             11530000
MOVESTAT  DC    4F'0'                                                               11540000
BEDZERO   DC    D'0'                  CONSTANT ZEROS                                11550000
BEDBLANK  DC    CL8' '                CONSTANT BLANK                                11560000
ELMTCTR   DC    H'0'                                                                11570000
BEDFLAG1  DC    X'00'                                                               11580000
INEOF     EQU   X'80'                 END OF FILE                                   11590000
PERMIERR  EQU   X'40'                 ERROR READING INPUT FILE                      11600000
SEP       DC    X'00'                 SEGMENT SEPARATOR                             11610000
FLAG1     DC    X'00'                 MISC FLAG                                     11620000
INIT      EQU   X'80'                 INITIALIZING                                  11630000
          SPACE 1                                                                   11640000
*--------------------------------------------------------------------*              11650000
*               DYNAMIC ALLOCATION CONTROL BLOCKS                    *              11660000
*--------------------------------------------------------------------*              11670000
          SPACE 1                                                                   11680000
DYNRBP    DC    0F'0',X'80',AL3(DYNRB)                                              11690000
DYNRB     DC    XL(S99RBEND-S99RB)'00'                                              11700000
          ORG   DYNRB+S99RBLN-S99RB                                                 11710000
          DC    AL1(S99RBEND-S99RB)                                                 11720000
```

```
            ORG     DYNRB+S99VERB-S99RB                              11730000
            DC      AL1(S99VRBAL)                                    11740000
            ORG     DYNRB+S99FLAG1-S99RB                             11750000
            DC      AL1(S99NOCNV)                                    11760000
            ORG                                                      11770000
SOALLOC     DC      A(TXTDD),AL1(128),AL3(TXTSO)                     11780000
DSCONCLS    DC      AL1(128),AL3(TXTCONC)                            11790000
DSALLOCS    DC      A(TXTDD,TXTDSN),AL1(128),AL3(TXTSHR)             11800000
DSALLOCO    DC      A(TXTDD,TXTDSN),AL1(128),AL3(TXTOLD)             11810000
DSUNALOC    DC      AL1(128),AL3(TXTDD)                              11820000
DSUNCONC    DC      AL1(128),AL3(TXTDDU)                             11830000
DSALLOCN    DC      A(TXTDD)                                         11840000
            DC      A(TXTDSN)                                        11850000
            DC      A(TXTNEW)                                        11860000
            DC      A(TXTNDISP)                                      11870000
            DC      A(TXTCDISP)                                      11880000
            DC      A(TXTUNITX)                                      11890000
            DC      A(TXTTRK)                                        11900000
            DC      A(TXTPRIME)                                      11910000
            DC      A(TXTSECND)                                      11920000
            DC      A(TXTRECFM)                                      11930000
            DC      A(TXTLRECL)                                      11940000
            DC      AL1(128),AL3(TXTBLKSZ)                           11950000
TXTCONC     DC      AL2(DCCDDNAM,2,8),CL8' ',AL2(8)                  11960000
TXTCONCX    DC      CL8' '                                           11970000
TXTTRK      DC      AL2(DALTRK,0)                                    11980000
TXTNEW      DC      AL2(DALSTATS,1,1),X'04'                          11990000
TXTNDISP    DC      AL2(DALNDISP,1,1),X'02'                          12000000
TXTCDISP    DC      AL2(DALCDISP,1,1),X'04'                          12010000
TXTRECFM    DC      AL2(DALRECFM,1,1),X'40'                          12020000
TXTLRECL    DC      AL2(DALLRECL,1,2),X'0202'                        12030000
TXTBLKSZ    DC      AL2(DALBLKSZ,1,2),X'3C40'                        12040000
TXTPRIME    DC      AL2(DALPRIME,1,3),X'000096'                      12050000
TXTSECND    DC      AL2(DALSECND,1,3),X'000000'                      12060000
TXTUNITX    DC      AL2(DALUNIT,1,5),CL5'SPACE'                      12070000
TXTOLD      DC      AL2(DALSTATS,1,1),X'01'                          12080000
TXTDD       DC      AL2(DALDDNAM,1,8),CL8' '                         12090000
TXTDDU      DC      AL2(DDCDDNAM,1,8),CL8' '                         12100000
TXTDSN      DC      AL2(DALDSNAM,1,44),CL44' '                       12110000
TXTSO       DC      AL2(DALSYSOU,1,1),C'W'                           12120000
TXTSHR      DC      AL2(DALSTATS,1,1),X'08'                          12130000
            SPACE   1                                                12140000
*---------------------------------------------------------*          12150000
*           SYSOUT DDNAME LIST                            *          12160000
*---------------------------------------------------------*          12170000
            SPACE   1                                                12180000
SOLIST      DC      CL8'MONITOR'                                     12190000
            DC      CL8'MYOUT'                                       12200000
            DC      CL8'REPORT'                                      12210000
            DC      CL8'SYSOUT'                                      12220000
            DC      CL8'MPT'                                         12230000
            DC      CL8'SBG'                                         12240000
            DC      CL8'EEO'                                         12250000
            DC      CL8'JSP'                                         12260000
            DC      CL8'REBLKERR'                                    12270000
            DC      CL8' '                                           12280000
            SPACE   1                                                12290000
*---------------------------------------------------------*          12300000
*           DDNAME-DSNAME LIST FOR DISP=SHR               *          12310000
*---------------------------------------------------------*          12320000
            SPACE   1                                                12330000
DSLIST      DC      CL8'ANSI'                                        12340000
DSNAT       DC      CL44' '                                          12350000
            DC      CL8'ANSIP'                                       12360000
DSNAP       DC      CL44' '                                          12370000
            DC      CL8'APPLOUT'                                     12380000
DSNXP       DC      CL44' '                                          12390000
            DC      CL8'APPLOUTX'                                    12400000
DSNXT       DC      CL44' '                                          12410000
            DC      CL8'CNT'                                         12420000
DSNCT       DC      CL44' '                                          12430000
            DC      CL8'CNTP'                                        12440000
DSNCP       DC      CL44' '                                          12450000
            DC      CL8'IDS'                                         12460000
DSNIT       DC      CL44' '                                          12470000
            DC      CL8'IDSP'                                        12480000
DSNIP       DC      CL44' '                                          12490000
            DC      CL8'COND'                                        12500000
DSNOT       DC      CL44' '                                          12510000
            DC      CL8'CONDX'                                       12520000
DSNOP       DC      CL44' '                                          12530000
            DC      CL8'VSAM',CL44'VAAEX.EDIS.D.TEST.RECOVERY'       12540000
            DC      CL8' '                                           12550000
            SPACE   1                                                12560000
*---------------------------------------------------------*          12570000
*           DDNAME-ALLOC LIST FOR DISP=SHR                *          12580000
*---------------------------------------------------------*          12590000
            SPACE   1                                                12600000
DSLISTS     DC      CL8'SONLG',X'90',X'0050',X'1810',X'000005'       12610000
            DC      CL8' '                                           12620000
            SPACE   1                                                12630000
*---------------------------------------------------------*          12640000
```

```
*         DDNAME-ALLOC LIST FOR DISP=OLD                              * 12650000
*-------------------------------------------------------------------* 12660000
          SPACE 1                                                      12670000
DSLISTO   DC    CL8'FAOUT',X'50',X'0800',X'5004',X'000032'              12680000
          DC    CL8'OUTPUT',X'50',X'0800',X'5004',X'000064'             12690000
          DC    CL8'TESTBED2',X'50',X'0C37',X'61BC',X'000005'           12700000
          DC    CL8'TESTBED',X'50',X'0800',X'5004',X'000001'            12710000
          DC    CL8'REJECT',X'50',X'0804',X'5028',X'000028'             12720000
          DC    CL8'RECOV',X'50',X'0804',X'5028',X'000028'              12730000
          DC    CL8'STORE',X'90',X'0050',X'1810',X'000010'              12740000
          DC    CL8' '                                                  12750000
          SPACE 1                                                       12760000
*-------------------------------------------------------------------* 12770000
*         DEFINITION OF PROGRAM STORAGE FOR PANEL VARIABLES          * 12780000
*-------------------------------------------------------------------* 12790000
          SPACE 1                                                       12800000
DSN       DC    CL44' '                                                 12810000
DSNW      DC    CL44' '                                                 12820000
DSNS      DC    CL44' '                                                 12830000
DSNL      DC    CL44' '                                                 12840000
STD       DC    CL8' '                                                  12850000
RLS       DC    CL5' '                                                  12860000
VERS      DC    CL12' '                                                 12870000
AGCY      DC    CL2' '                                                  12880000
REAS      DC    CL71' '                                                 12890000
LASTSEG   DC    CL6' '                                                  12900000
NUMB      DC    CL6' '                                                  12910000
TRANDATA  EQU   STD,*-STD,C'C'                                          12920000
          DS    0F                                                      12930000
RTNCODE   DC    CL4' '                                                  12940000
REEZCODE  DC    CL2' '                                                  12950000
DDERR     DC    CL8' '                                                  12960000
          SPACE 1                                                       12970000
*-------------------------------------------------------------------* 12980000
*         DEFINITION OF ISPF SERVICE REQUESTS                        * 12990000
*-------------------------------------------------------------------* 13000000
          SPACE 1                                                       13010000
DISPLAY   DC    CL8'DISPLAY'                                            13020000
EDIT      DC    CL8'EDIT'                                               13030000
PRIMARY   DC    CL8'EDITB'                                              13040000
PANEL2    DC    CL8'EDITB1'                                             13050000
PANEL3    DC    CL8'EDITB2'                                             13060000
CONTROL   DC    C'CONTROL'                                              13070000
SELECT    DC    C'SELECT'                                               13080000
ERRORS    DC    C'ERRORS'                                               13090000
RETURN    DC    C'RETURN'                                               13100000
VDEFINE   DC    CL8'VDEFINE'                                            13110000
VGET      DC    CL8'VGET'                                               13120000
VPUT      DC    CL8'VPUT'                                               13130000
PROFILE   DC    CL8'PROFILE'                                            13140000
SHARED    DC    CL8'SHARED'                                             13150000
CHAR      DC    CL8'CHAR'                                               13160000
HEX       DC    CL8'HEX'                                                13170000
TBCREATE  DC    CL8'TBCREATE'                                           13180000
TBDISPL   DC    CL8'TBDISPL'                                            13190000
TBADD     DC    CL8'TBADD'                                              13200000
TBTOP     DC    CL8'TBTOP'                                              13210000
TBSARG    DC    CL8'TBSARG'                                             13220000
TBCLOSE   DC    CL8'TBCLOSE'                                            13230000
LOG       DC    CL8'LOG'                                                13240000
SETMSG    DC    CL8'SETMSG'                                             13250000
VARTABLE  DC    CL8'VARTABLE'                                           13260000
NOWRITE   DC    CL8'NOWRITE'                                            13270000
VARLIST   DC    C'(TBNUMB TBREAS)'                                      13280000
SAVLIST   DC    C'(TBDSN TBDSNW TBDSNS TBDSNAT TBDSNAP TBDSNCT TBDSNCP T*13290000
                BDSNIT TBDSNIP TBDSNXT TBDSNXP TBDSNOT TBDSNOP TBDSNL)' 13300000
USERLIST  DC    C'(ZUSER)'                                              13310000
          SPACE 1                                                       13320000
*-------------------------------------------------------------------* 13330000
*         DEFINITION OF LENGTH OF PANEL VARIABLES                    * 13340000
*-------------------------------------------------------------------* 13350000
          SPACE 1                                                       13360000
LENGTH2   DC    F'2'                                                    13370000
LENGTH4   DC    F'4'                                                    13380000
LENGTH5   DC    F'5'                                                    13390000
LENGTH6   DC    F'6'                                                    13400000
LENGTH8   DC    F'8'                                                    13410000
LENGTH11  DC    F'11'                                                   13420000
LENGTH12  DC    F'12'                                                   13430000
LENGTH44  DC    F'44'                                                   13440000
LENGTH71  DC    F'71'                                                   13450000
          SPACE 1                                                       13460000
*-------------------------------------------------------------------* 13470000
*         DEFINITION OF PANEL VARIABLES                              * 13480000
*-------------------------------------------------------------------* 13490000
          SPACE 1                                                       13500000
SELCMD    DC    C'CMD(%EDITB)'                                          13510000
ZUSERLIT  DC    C'(ZUSER)'                                              13520000
DSNLIT    DC    C'(TBDSN)'                                              13530000
DSNWLIT   DC    C'(TBDSNW)'                                             13540000
DSNSLIT   DC    C'(TBDSNS)'                                             13550000
DSNLLIT   DC    C'(TBDSNL)'                                             13560000
DSNALIT   DC    C'(TBDSNAT)'                                            13570000
```

```
DSNALITP  DC       C'(TBDSNAP)'                                         13580000
DSNCLITT  DC       C'(TBDSNCT)'                                         13590000
DSNCLITP  DC       C'(TBDSNCP)'                                         13600000
DSNILITT  DC       C'(TBDSNIT)'                                         13610000
DSNILITP  DC       C'(TBDSNIP)'                                         13620000
DSNXLITT  DC       C'(TBDSNXT)'                                         13630000
DSNXLITP  DC       C'(TBDSNXP)'                                         13640000
DSNOLITT  DC       C'(TBDSNOT)'                                         13650000
DSNOLITP  DC       C'(TBDSNOP)'                                         13660000
STDLIT    DC       C'(TBSTD)'                                           13670000
RLSLIT    DC       C'(TBRLS)'                                           13680000
VERSLIT   DC       C'(TBVER)'                                           13690000
AGCYLIT   DC       C'(TA)'                                              13700000
REASLIT   DC       C'(TBREAS)'                                          13710000
NUMBLIT   DC       C'(TBNUMB)'                                          13720000
LASTLIT   DC       C'(TLASTS)'                                          13730000
RTC       DC       C'(RTC)'                                             13740000
REEZ      DC       C'(REEZ)'                                            13750000
DD        DC       C'(DD)'                                              13760000
          SPACE 1                                                       13770000
*---------------------------------------------------------------------* 13780000
*         DCB'S                                                       * 13790000
*---------------------------------------------------------------------* 13800000
          SPACE 1                                                       13810000
ERRDCB    DCB      DDNAME=TESTBED2,DSORG=PS,MACRF=GM                    13820000
          SPACE 1                                                       13830000
INPDCB    DCB      DDNAME=INPUT,DSORG=PS,MACRF=GL                       13840000
          SPACE 1                                                       13850000
OUTDCB    DCB      DDNAME=SGMTFILE,DSORG=PS,MACRF=PM                    13860000
          SPACE 1                                                       13870000
STOREDCB  DCB      DDNAME=STORE,DSORG=PS,MACRF=PM                       13880000
          SPACE 1                                                       13890000
LOGDCB    DCB      DDNAME=LOG,DSORG=PS,MACRF=PM                         13900000
          SPACE 1                                                       13910000
OUTDCBX   DCB      DDNAME=SGMTFILE,DSORG=PS,MACRF=GL                    13920000
          SPACE 1                                                       13930000
          LTORG                                                         13940000
          SPACE 1                                                       13950000
ERRRDW    DC       AL2(*-*,0)                                           13960000
ERRBUEF   DS       XL3123              ERROR BUFFER RECORD              13970000
BDMODNUM  DC       CL8'MD00049'        EDI MOD NUMBER                   99999996
          END                                                           99999999
```

What is claimed is:

1. A method for interactively translating electronic data interchange files, comprising the steps of:
   (a) generating a plurality of displays for interactively controlling the translation of an electronic data interchange file;
   (b) translating said electronic data interchange file until a translation error exists;
   (c) displaying said translation error on at least one of said plurality of displays so that said translation error may be corrected interactively;
   (d) correcting said displayed translation error in response to data entered on said at least one of said plurality of displays; and
   (e) repeating steps (a) through (d) until no translation error exists.

2. The method of claim 1, wherein said electronic data interchange file comprises transaction data to be communicated from a sending computer to a receiving computer and said translating step occurs after communicating said electronic data interchange file to said receiving computer.

3. The method of claim 2, wherein said correcting step further comprises the steps of:
   forming a segment file for containing a portion of said electronic data interchange file where said portion includes said translation error;
   placing said portion of said electronic data interchange file into said segment file;
   displaying said portion on said at least one of said plurality of displays for correcting said translation error; and
   forming a working file comprising all correctly translated portions of said electronic data interchange file.

4. The method of claim 2, wherein said displaying and correcting steps occur interactively without the need to retranslate all previously translated portions of said electronic data interchange file.

5. The method of claim 1, further comprising the step of logging each of said translation error occurring during the translation of said electronic data interchange file.

6. The method of claim 1, further comprising the step of forming a working file of all correctly translated portions of said electronic data interchange file.

7. A programmable machine system for interactively translating business transaction data between a plurality of different dictionary-structured transaction formats, said machine system including a plurality of system components, said machine system comprising:
   output circuitry for generating a plurality of visible signals corresponding to the status of translation of said business transaction data from one format to another predetermined format;
   translation circuitry for translating said business transaction data into said predetermined format;
   error detection and reporting circuitry for detecting the existence of a translation error and communicating said translation error to said output circuitry;
   editing circuitry for interactively receiving corrections to said business transaction data and for modifying said business transaction data in response to said corrections generating corrected business transaction data; and
   said translation circuitry translating said corrected business transaction data.

* * * * *